(12) United States Patent
Igarashi

(10) Patent No.: US 7,847,981 B2
(45) Date of Patent: Dec. 7, 2010

(54) IMAGE FORMING DEVICE AND METHOD TRANSPORTING SHEET FOR PRINTING AFTER ENCODING OF PAPER FINGERPRINT DATA IS COMPLETE

(75) Inventor: Hiroya Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 757 days.

(21) Appl. No.: 11/843,862

(22) Filed: Aug. 23, 2007

(65) Prior Publication Data

US 2008/0130038 A1 Jun. 5, 2008

(30) Foreign Application Priority Data

Dec. 5, 2006 (JP) ............... 2006-328522

(51) Int. Cl.
*G06K 15/02* (2006.01)
*G06K 15/16* (2006.01)
*H04N 1/23* (2006.01)
*B41M 3/10* (2006.01)
*G06K 15/14* (2006.01)
*G06K 19/06* (2006.01)
*G07D 7/00* (2006.01)

(52) U.S. Cl. ............... 358/3.28; 358/1.12; 358/300; 399/16; 399/388

(58) Field of Classification Search ............... 358/1.9, 358/3.28, 1.12, 1.18, 526, 448, 470, 498, 358/296, 1.14; 399/15, 16, 381, 388, 366; 235/494; 283/114, 902; 382/135, 137, 286, 382/100; 347/105–107; 400/62, 104

See application file for complete search history.

(56) References Cited

U.S. PATENT DOCUMENTS

| 6,137,590 | A * | 10/2000 | Mori ............... 358/1.18 |
| 7,720,314 | B2 * | 5/2010 | Minamino ............... 382/100 |
| 7,731,435 | B2 * | 6/2010 | Piersol et al. ............... 400/62 |
| 2008/0267464 | A1 * | 10/2008 | Goda ............... 382/124 |
| 2009/0208228 | A1 * | 8/2009 | Asasaka et al. ............... 399/15 |

FOREIGN PATENT DOCUMENTS

JP 2004-151833 5/2004

* cited by examiner

*Primary Examiner*—Scott A Rogers
(74) *Attorney, Agent, or Firm*—Fitzpatrick, Cella, Harper & Scinto

(57) ABSTRACT

An image forming device is provided which is capable of printing paper fingerprint data encoded into code data on a paper sheet without inducing significant degradation of printing performance due to the slowing of the printing speed. In order to halt paper sheet transport until the processing of sending composite image data, including paper fingerprint data, to a printer has completed, a control component issues to a paper sheet transport control component instructions to halt paper sheet transport temporarily after the scanning of paper fingerprint. The paper sheet transport control component halts paper sheet transport after receiving these instructions. Subsequently, when composite image data is sent to the printer and is ready to be printed on the paper sheet, the control component issues to the paper sheet transport control component instructions to resume paper sheet transport. The paper sheet transport control component resumes paper sheet transport after receiving these instructions.

12 Claims, 19 Drawing Sheets

PAPER FINGERPRINT INFORMATION A n m

PAPER FINGERPRINT INFORMATION B n m

IMAGE FORMING DEVICE AND METHOD TRANSPORTING SHEET FOR PRINTING AFTER ENCODING OF PAPER FINGERPRINT DATA IS COMPLETE

BACKGROUND OF THE INVENTION

1. Field of the Invention

The present invention relates to image forming device and image forming methods which are capable of handling paper fingerprint information.

2. Description of the Related Art

As one example of technology that prevents the falsification of paper documents, there exists technology that uses paper fingerprint data as information to identify individual sheet of paper. Paper sheet is composed of fine intertwined natural fibers; the intertwined configuration of these natural fibers is random, and the possibility of the existence of more than one paper sheet having the exact same fiber pattern is thought to be extremely low. Consequently, these paper fiber patterns can be used as paper fingerprint data. Similar to the fingerprints of human beings, this paper fingerprint data has the characteristic of being different for every single sheet of paper. In addition, paper fiber patterns are durable and do not break apart even when bent to some degree. The paper fiber patterns also exhibit little change as time passes. For these reasons, paper fingerprint data may be used as information to identify individual sheets of paper over a long period of time. As a method for guaranteeing a document as an original using paper fingerprint data, Japanese Patent Laid-Open No. 2004-151833 describes a method wherein paper fingerprint data of an original document is converted into a two-dimensional code, barcode, or similar codes, and the code is then printed on the original document.

In the method described in Japanese Patent Laid-Open No. 2004-151833, a user uses a scanner to scan the paper fingerprint data corresponding to the paper sheet of the original document. Next, the user needs to load the paper sheet into a printing device, and needs to issue instructions to print the code which represents the paper fingerprint data on the paper sheet. This is a highly cumbersome procedure for the user. Furthermore, for improving detection accuracy of the paper fingerprint data, care needs to be taken so that characters or other figures are not printed on the area of the paper where the paper fingerprint data was scanned. For that reason, it is necessary for the user to exercise care even in paper sheet arrangement when loading the paper sheet into the printing device. Meanwhile, there are also cases where the time required to convert the paper fingerprint data into code data is longer than the time elapsed between the start of scanning the paper fingerprint data and the start of printing. In other words, when the paper sheet is transported at a normal transport speed for printing, there are cases in which the processing that converts the paper fingerprint data into code data has not been completed by the time of the start of printing. In cases such as these, there arises the problem that the code cannot be printed on the paper sheet. If the paper sheet transport speed is slowed to avoid this problem, there arises another problem that printing performance is significantly degraded.

SUMMARY OF THE INVENTION

In order to solve the problems outlined above, there is provided in the present invention an image forming device as follows.

In one aspect of the image forming device of the present invention, there is provided a scanning component scanning image data on an output paper sheet, an extracting component extracting paper fingerprint data from the image data, an encoding component converting paper fingerprint data into code data, a printing component printing code data and document data on the output paper sheet, determining component determining whether the encoding of the paper fingerprint data has been completed, and a paper sheet transport control component transporting the output paper sheet to the printing component after the encoding has been completed.

In an another aspect of the image forming device of the present invention, there is provided a scanning component scanning paper fingerprint data from a fed paper sheet, a conversion component converting paper fingerprint data into coded image data, a generation component compositing document data and the coded image data to generate composite image data, a printing component printing composite image data on the paper sheet, a transport component transporting the paper sheet to the printing component, and a control component controlling the transport of the paper sheet. The control component, after the paper fingerprint data is scanned, halts paper sheet transport until the generation component completes generation of the composite image data. After completion of generating the composite image data, the control component resumes transport of the paper sheet to the printing component.

In an another aspect of the image forming device of the present invention, there is provided a scanning component scanning paper fingerprint data on a first side of a fed paper sheet, a conversion component converting paper fingerprint data into coded image data, a generation component compositing document data and coded image data to generate composite image data, a printing component printing composite image data on the first side of the paper sheet, a transport component transporting the paper sheet to the printing component, and a control component controlling the transport of the paper sheet. After the paper fingerprint data is scanned, the printing component prints on a second side of the paper sheet. The control component halts transport of the second side-printed paper sheet until completion of generating the composite image data. After completion of generating the composite image data, the control component resumes transport of the second side-printed paper sheet to the printing component, and controls printing of the composite image data on the first side of the paper sheet.

In an another aspect of the image forming device of the present invention, there is provided a scanning component scanning paper fingerprint data from a fed paper sheet, a memory component storing the paper fingerprint data, a housing component housing the paper sheet from which paper fingerprint data has been scanned in a both-surface tray, a conversion component converting the paper fingerprint data stored in the memory component into coded image data, a generation component compositing document data and coded image data to generate composite image data, a printing component printing the composite image data on the paper sheet, a transport component transporting the paper sheet to the printing component, and a control component controlling the transport of the paper sheet. The control component controls transport of the paper sheet housed in the both-surface tray to the printing component after the paper fingerprint data has been scanned and after completion of generating the composite image data.

An image forming method of the present invention comprises scanning image data on an output paper sheet, extracting paper fingerprint data from the image data, converting the paper fingerprint data into code data, printing the code data and document data on the output paper sheet, determining whether encoding of the paper fingerprint data has been completed, and transporting the output paper sheet to the printing device after the encoding has been completed.

Another image forming method of the present invention comprises scanning image data on an output paper sheet, housing the output paper sheet in a housing device, extracting paper fingerprint data from the image data, converting the paper fingerprint data into code data, printing the code data and document data on the output paper sheet, determining whether the converting has been completed, and transporting the output paper sheet being housed in the housing device to the printing device after the converting has been completed.

A computer-readable medium of the present invention having computer-executable instructions which when executed perform the steps of scanning image data on an output paper sheet, extracting paper fingerprint data from the image data, converting the paper fingerprint data into code data, printing the code data and document data on the output paper sheet, determining whether the converting has been completed, and transporting the output paper sheet to the printing device after the converting has been completed.

Another computer-readable medium of the present invention having computer-executable instructions which when executed perform the steps of scanning image data on an output paper sheet, housing the output paper sheet in a housing device, extracting paper fingerprint data from the image data, converting the paper fingerprint data into code data, printing the code data and document data on the output paper sheet, determining whether the converting has been completed, and transporting the output paper sheet housed in the housing device to the printing device after the converting has been completed.

As a result of the present invention, code data of paper fingerprint data may be printed on a paper sheet without inducing significant degradation of printing performance due to the slowing of the printing speed. The reason for this is that the transport of the paper sheet is halted temporarily, until completion of the conversion processing of the paper fingerprint data into code data, and the transport of the paper sheet is resumed after completion of the conversion processing.

Further features of the present invention will become apparent from the following description of exemplary embodiments (with reference to the attached drawings).

DESCRIPTION OF THE EMBODIMENTS

Hereinafter, the embodiments of the present invention will be described with reference to the accompanying drawings.

Example Configuration of a Printing System

Figure 1:
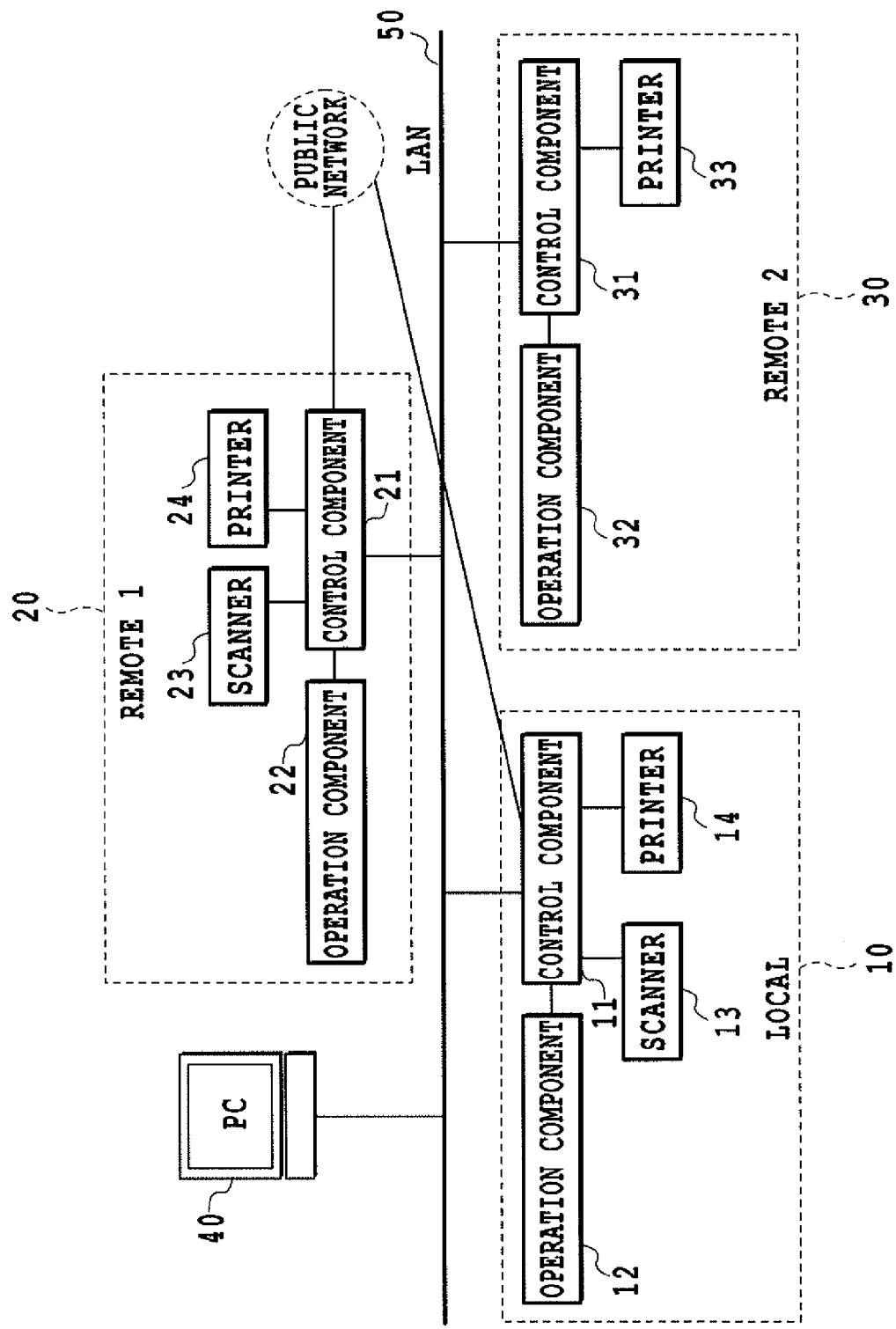
FIG. 1 is a block diagram showing an example configuration of the present invention applied to a printing system.

FIG. 1 is a block diagram showing an example configuration of the present invention applied to a printing system.

The printing system comprises four devices, a single PC 40 and three image forming devices 10, 20, and 30, connected via a LAN 50, but the number of these connected devices is not limited to four. In addition, according to the example configuration a LAN is adopted as the connection medium, but the connection medium is not limited to a LAN, and for example a WAN (wide area network) or other communication network, a serial transmission method such as USB, or a parallel transmission method such as a Centronics (parallel port) or SCSI interface may also be adopted.

The PC 40 plays the role of a host computer which controls the printing system. For example, the PC 40 may execute the sending and receiving of files using the FTP or SMB protocol via the LAN 50 or a WAN, or send and receive e-mail. Furthermore, the PC 40 may issue print commands to the image forming devices 10, 20, and 30 using installed printer drivers.

The image forming devices 10 and 20 are taken to be of the same configuration, whereas the configuration of the image forming device 30 differs from the image forming devices 10 and 20 in that it is not provided with a scanner 23. For example, the image forming device 10 comprises a control component 11, an operation component 12, a scanner 13 and a printer 14.

Example Configuration of an Image Forming Device

Figure 2:
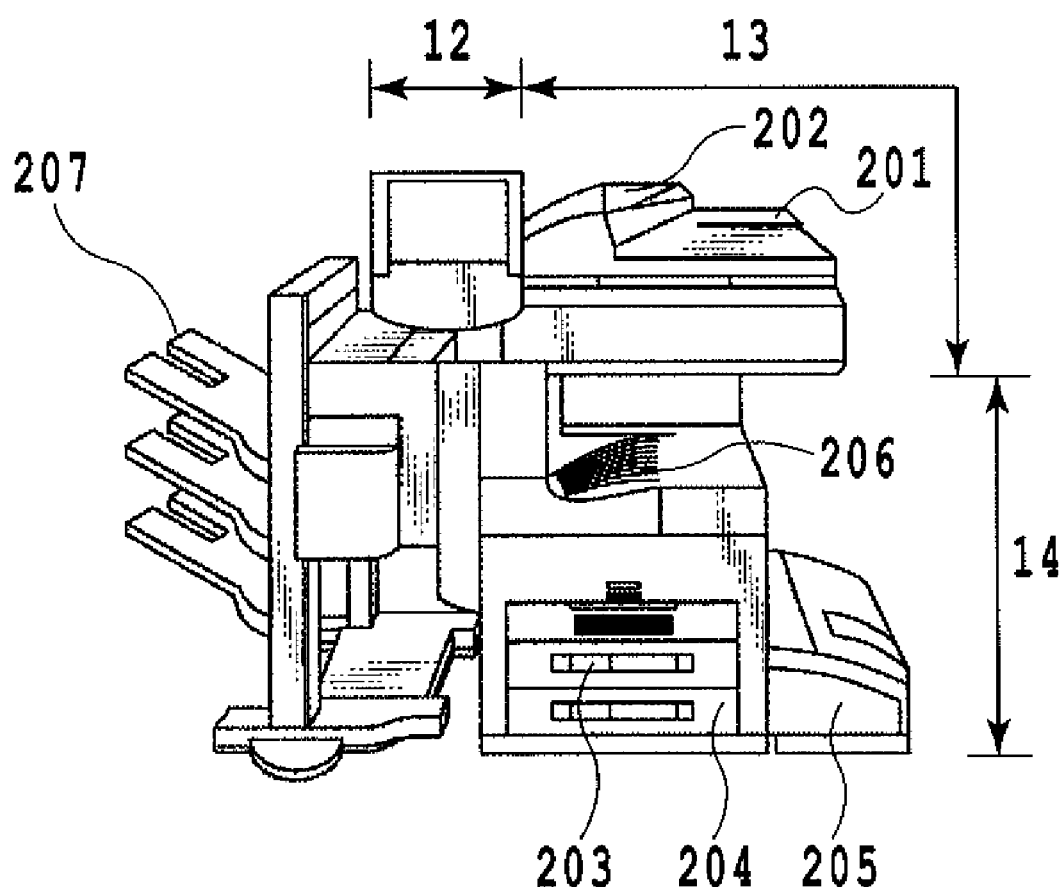
FIG. 2 is an exterior view of an image forming device.

FIG. 2 is an exterior view of an image forming device.

In FIGS. 1 and 2, the image forming device 10 is provided with a scanner 13 which acts as an image scanning device, a printer 14 which acts as an image output device, a control component 11 which controls the entire operation of the image forming device 10, and an operation component 12 which provides a user interface (UI). In FIG. 2 there are an original feeder 201, a tray 202, paper cassettes 203, 204, and 205, and paper catch trays 206 and 207.

The scanner 13 converts image information into an electric signal by inputting reflected light obtained via exposure scanning of image data on an original document into CCDs. The electric signal is further converted into a luminance signal composed of separate R, G, and B color streams, and the luminance signal is output to the control component 11 as image data.

The scanner 13 has a plurality of CCDs. If the sensitivity of every CCD differs, each pixel density of the original document will be recognized as being different, even if every pixel density is actually the same. For that reason the scanner 13 first converts the reflected light amount obtained via exposure scanning of a uniformly white plate into electric signals, and outputs the signals to the control component 11.

Inside the control component 11, a shading correction component to be hereinafter described recognizes the sensitivity differences among the CCDs based on the electric signals obtained from each CCD. Additionally, the shading correction component corrects the values of the electric signal obtained from the original document image, using the recognized sensitivity differences as a basis. Furthermore, the shading correction component receives gain adjustment information from the CPU 301 inside the control component 11, and performs gain adjustments in accordance with the information. Gain adjustment is used to adjust the way in which the electric signal values obtained via exposure scanning of an original document are allocated to the 0-255 luminance signal values. Through the use of gain adjustment, the electric signal values obtained via exposure scanning of the original document may be converted into high or low luminance signal values.

Original documents are loaded into the tray 202 of the original feeder 201.

The operation component 12 receives instructions from the user. When the operation component 12 receives an instruction from the user to begin the scanning of an original document, the control component 11 issues to the scanner 13 an instruction to scan the original document.

When the scanner 13 receives an instruction to scan the original document, it feeds singly original document sheets from the tray 202 of the original feeder 201, and commences the scanning operation. It should be appreciated that the method for scanning the original document is not limited to automatic feeding method by means of the original feeder 201, but that a scanning method, wherein sheets of the original document are laid on a glass surface (not shown in the drawings) and an exposure component is moved across the sheets, may also be performed.

The printer 14 is a device for forming images from image data received from the control component 11 on paper sheets. It should be appreciated that electrophotographic methods using a photoreceptive drum or photoreceptive belt, or inkjet methods wherein ink is discharged onto paper sheet from a microscopic nozzle array may be used as the method for forming images. The printer 14 is provided with a plurality of paper cassettes 203, 204, and 205 from which different paper sheet sizes and different paper orientations may be selected. After printing, printed paper sheets are discharged to the catch trays 206 and 207 in the finisher.

Figure 10:
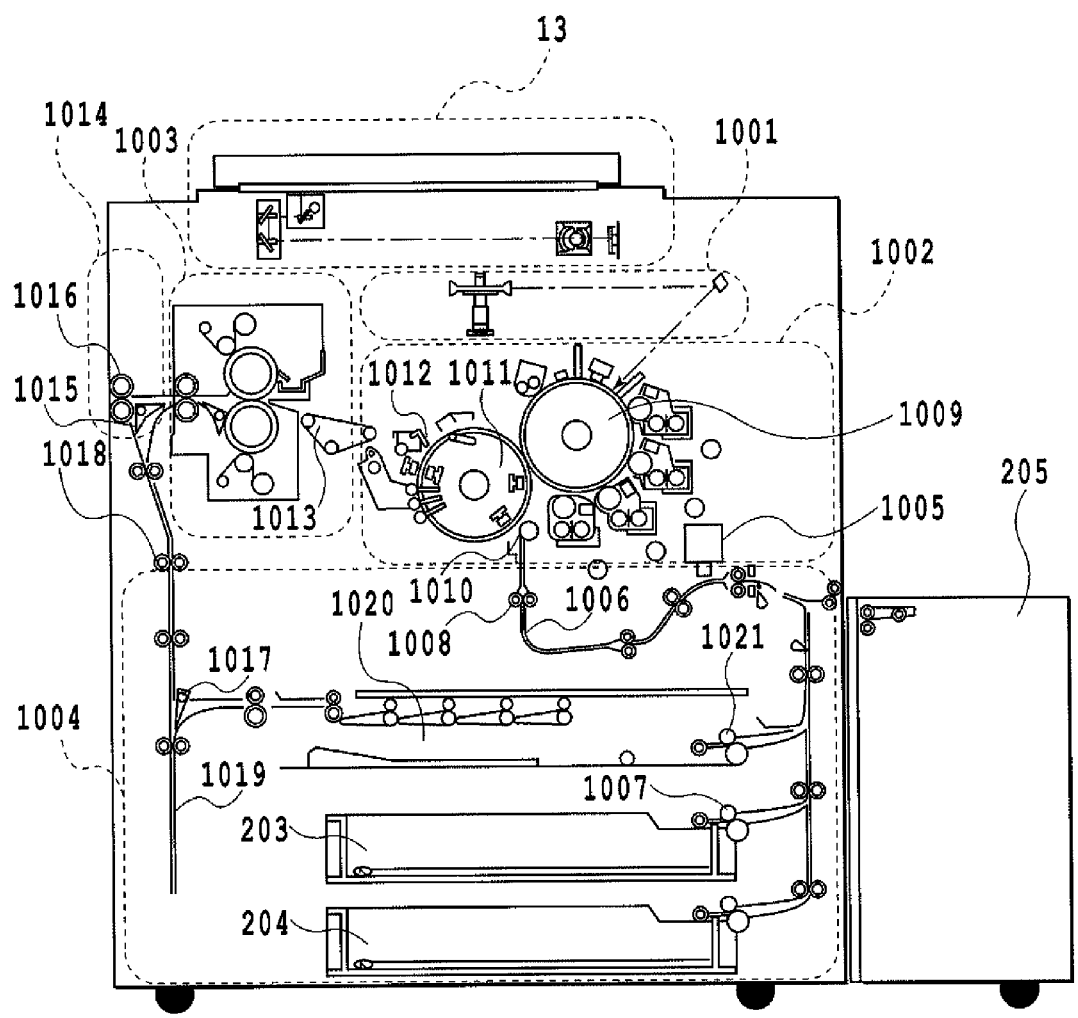
FIG. 10 is a cross-sectional view of a printer.

FIG. 10 is a cross-sectional view of a printer.

The printer 14 is provided with a laser exposure component 1001, an image creation component 1002, a fixing component 1003, and a paper feeding/transport component 1004.

The laser exposure component 1001, in response to image data, directs modulated light such as laser light into a rotating polygon mirror rotating at a constant angular velocity. The reflected scanning light is exposed onto a photoreceptive drum 1009.

The image creation component 1002 rotationally drives and charges the photoreceptive drum 1009 using a charger. Subsequently, the image creation component 1002 develops the latent image that was formed on the photoreceptive drum 1009 using toner by the laser exposure component 1001. The image creation component 1002 then transfers the toner image to paper sheets.

At the time of the image transfer, the laser exposure component 1001 collects the microscopic toner that is not transferred and remains on the photoreceptive drum 1009. By executing the foregoing sequence of electrophotographic processes, the image creation component 1002 creates images.

Paper sheets are rolled on a predetermined position on a transfer belt for four rotations, during which time a development unit (development station), having magenta (M), cyan (C), yellow (Y), and black (K) toner, repeatedly executes the above-described electrophotographic process. After four rotations the paper sheets, whereupon a four-pigment full-color toner image has been transferred, separate from a transfer drum 1011 and are transported to the fixing component 1003.

The fixing component 1003 is provided with one or more rollers, belts, and heat sources such as a halogen heater. The fixing component 1003 melts and fixes the toner on the paper sheets constituting the transferred toner image on the paper sheets.

The paper feeding/transport component 1004 is provided with at least one paper sheet housing such as a paper sheet cassette or paper deck. In response to instructions from the control component 11, the paper feeding/transport component 1004 separates a single paper sheet from the plurality of paper sheets housed in the paper sheet housing and transports the single sheet to the image creation component 1002 and the fixing component 1003. The transported paper sheet is rolled on the transfer drum 1011 of the image creation component 1002, and transported to the fixing component 1003 after four rotations. During the time of the paper sheet's four rotations, toner images using each pigment YMCK are transferred to the paper sheet. Alternatively, in the case where images are formed on both sides of the paper sheet, the control component 11 controls such that the paper sheet having passed through the fixing component 1003 is again transported through the transport path to the image creation component 1002.

The paper fingerprint scanning sensor 1005, the purpose of which is to scan the paper fingerprint data of fed paper sheets, is placed on the paper sheet transport path 1006. The paper fingerprint scanning sensor 1005 scans the fiber contours of a fed paper sheet and converts the information from the scanned fiber contour image into an electric signal. Subsequently, the paper fingerprint sensor 1005 converts the electric signal into a luminance signal composed of separate R, G, and B color streams, and outputs this luminance signal to the control component 11 as image data.

The paper feeding/transport component 1004 is provided with paper cassettes 203, 204, and 205, a plurality of paper feed rollers 1007, and a plurality of resist rollers 1008.

The paper cassettes 203, 204, and 205 house paper sheets of various sizes and materials. Each paper cassette is individually provided with a paper feed roller 1007.

The paper feed rollers 1007 feed paper sheets singly. Specifically, pickup rollers sequentially send out paper sheets loaded into the paper cassettes. To prevent double feeding, separation rollers placed opposite to the paper feed rollers 1007 send out paper sheets singly to one or more transport guides. At the separation rollers, torque limiters are interposed and input driving rotational force in the opposite direction to transport direction. When a single paper sheet enters the nip component formed in the space between the paper feed rollers 1007 and the separation rollers, the separation rollers are driven in accordance with the paper sheet and thereby rotate in the transport direction. Correspondingly, in the case where double feeding of paper sheets occurs, the separation rollers rotate in the opposite direction to transport direction, thereby returning the doubly-fed sheet and sending out only the single uppermost paper sheet. The sent-out paper sheet passes between the transport guides and, by means of the driving force of a plurality of transport rollers, the sheet is transported to the resist rollers 1008. At this point the resist rollers 1008 are halted and the tip of the paper sheet butts the nip component formed by a pair of resist rollers 1008. The paper sheet forms a loop and any oblique orientation is corrected. Thereafter the control component 11, matching the timing of the formation of a toner image on the photoreceptive drum 1009, causes the resist rollers 1008 to rotate and transport the paper sheet.

An adsorption roller 1010 causes the paper sheet transported by the resist rollers 1008 to be adsorbed to the surface of the transfer drum 1011 by static electricity. Meanwhile, a toner image is formed on the photoreceptive drum 1009 in accordance with the predetermined process. The paper sheet, adsorbed to the transfer drum 1011, rotates in accordance with the rotation of the transfer drum 1011. Subsequently, the transfer charger applies a high voltage to a position opposite to the photoreceptive drum 1009, thereby causing the toner image on the photoreceptive drum 1009 to be transferred to the surface of the paper sheet by static electricity. In the case of the formation of a color image, the paper sheet on the transfer drum 1011 makes further rotations, and by repetition toner images of each of the four pigments CMYK are individually transferred to the paper sheet.

The paper sheet, having finished the transfer process, is separated from the transfer drum 1011 by a separation claw 1012.

A pre-fixing transport component 1013 transports the separated paper sheet to the fixing component 1003. The pre-fixing transport component 1013 is provided with a belt suspended over a plurality of rollers and at least one suction fan. The paper sheet is suctioned to the rubber belt by at least one suction fan, and is transported as a result of the driving source rotating the rubber belt.

The fixing component 1003 causes the toner image on the paper sheet to fix by applying pressure and heat. The paper sheet is then fed to the paper discharge component 1014.

The paper discharge component 1014 is provided with a paper discharge flapper 1015 and paper discharge rollers 1016. The paper discharge flapper 1015 is configured such that it is able to oscillate about an oscillation shaft, thereby establishing the transport direction of paper sheets. As the paper discharge flapper 1015 oscillates in a clockwise direction, the paper sheet is transported straight ahead, and by the action of the paper discharge rollers 1016, discharged outside the device. However, in the case where images are formed on both sides of the paper sheet, the paper discharge flapper 1015 oscillates in a counter-clockwise direction, whereby the paper sheet course is changed to the opposite direction and the paper sheet is fed into a both-surface transport component.

The both-surface transport component is provided with a reverse flapper 1017, reverse rollers 1018, reverse guides 1019, and a both-surface tray 1020.

The reverse flapper 1017 is configured such that it is able to oscillate about an oscillation shaft, thereby establishing the transport direction of paper sheets. First, the reverse flapper 1017 oscillates in a counter-clockwise direction, whereby the paper sheet is fed into the reverse guides 1019 by the reverse rollers 1018. The reverse rollers 1018 temporarily halt with the hindmost tip of the paper sheet caught in the reverse rollers 1018, and subsequently the reverse flapper 1017 oscillates in a clockwise direction. In addition, the reverse rollers 1018 rotate in the opposite direction, such that the paper sheet is transported in a switchback manner. As a result, the hindmost tip and the uppermost tip of the paper sheet switch places, and in such condition the paper sheet is subsequently led to a both-surface tray 1020.

The paper sheet is temporarily loaded into the both-surface tray 1020. Thereafter, the paper sheet is fed into the resist rollers 1008 a second time by at least one re-feed roller 1021. At this point, the paper sheet is sent to the photoreceptive drum 1009 with its surface facing in the opposite direction as compared to its facing during the transfer process of the first side. In a process similar to the above-described, an image is formed on the second side of the paper sheet, and thereby images are formed on both sides of the sheet. The paper sheet is then subjected to the fixing process and discharged outside the device.

Figure 3:
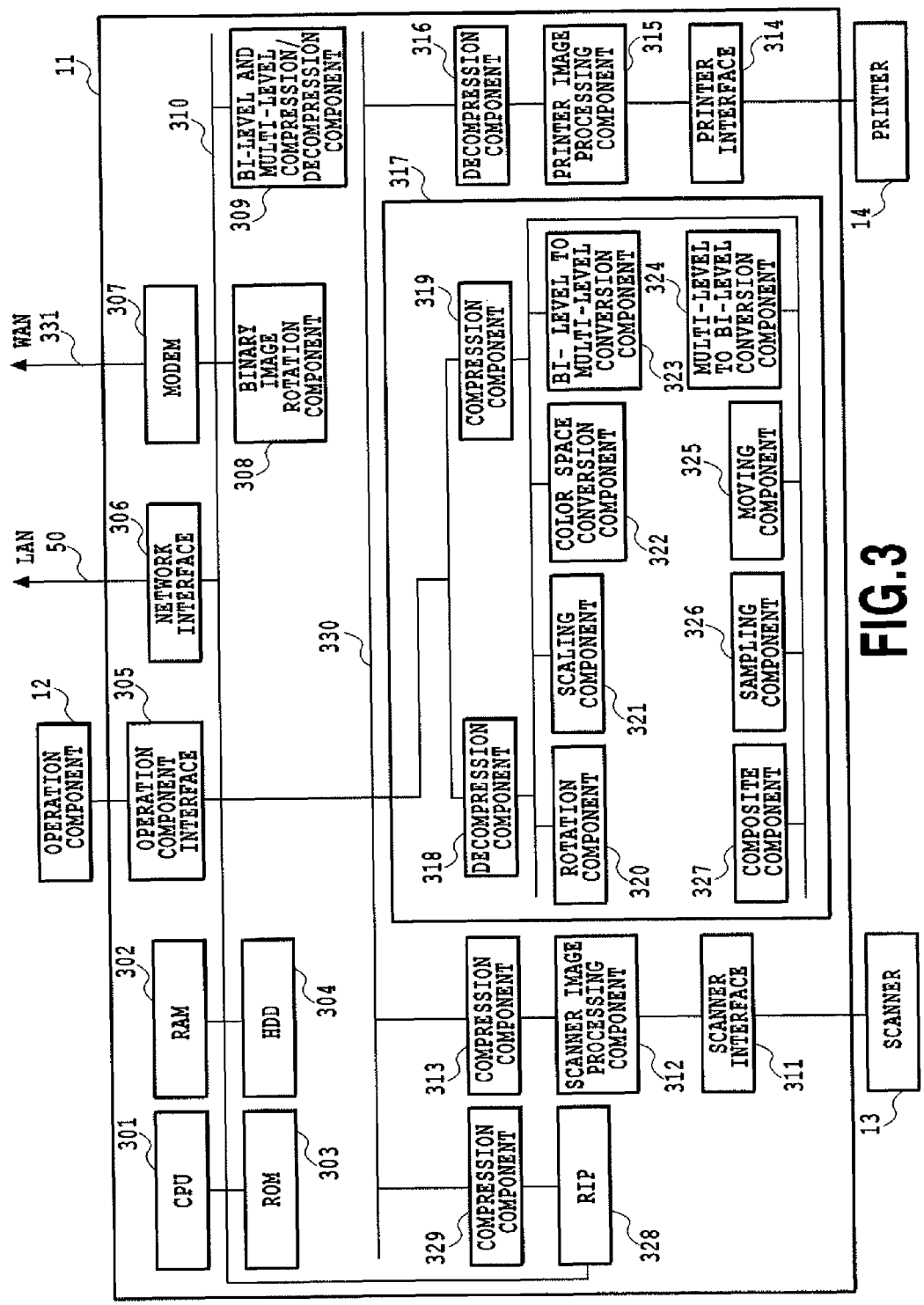
FIG. 3 is a block diagram showing an example configuration of a control component of an image forming device.

FIG. 3 is a block diagram showing an example configuration of a control component 11 of an image forming device 10.

The control component 11, the paper fingerprint scanning sensor 1005 (FIG. 10), the scanner 13, and the printer 14 are electrically connected. Alternatively, the paper fingerprint scanning sensor 1005 is connected to the PC 40 or other external device via a LAN 50 or a WAN 331 and inputs/outputs data such as image data and device status information.

A CPU 301, using a control program or other program stored in a ROM 303, totally controls access to various connected devices, and in addition controls the various processing executed by the control component 11.

A RAM module 302 acts as the system work memory used by the CPU 301, and in addition has the purpose of temporarily storing image data. The RAM 302 may comprise SRAM, which stores the contents of the memory even after the power supply is turned off, or it may comprise DRAM, in which the contents of the memory are erased once the power supply is turned off. The ROM 303 stores data such as the device boot program. A hard disk drive (HDD) 304 stores data such as system software and image data.

An operation interface 305 connects a system bus 310 with the operation component 12. The operation interface 305 receives image data to be displayed on the operation component 12 from the system bus 310, outputs the data to the operation component 12, and in addition receives information input by the user on the operation component 12 and outputs the information to the system bus 310.

A network interface 306 connects the LAN 50 with system bus 310, and inputs/outputs data sent between the LAN 50 and the system bus 310.

A modem 307 connects the WAN 331 with the system bus 310, and inputs/output data sent between the WAN 331 and the system bus 310.

A binary image rotation component 308 changes the orientation of image data before the data is sent.

A bi-level and multi-level compression/decompression component 309 changes the resolution of image data to a predetermined resolution or to a resolution that matches the capability of the destination device before the data is sent. Methods such as JBIG, MMR, MR, or MH may be used.

An image bus 330 provides a transmission route for the exchange of image data, and may comprise a PCI bus or IEEE 1394.

A scanner image processing component 312 performs correction, treatment, and editing operations on image data received from the paper fingerprint scanning sensor 1005, and also the scanner 13 via a scanner interface 311. The scanner image processing component 312 determines whether image data represents a color or black & white original, and also whether image data represents a character or photographic original. The scanner image processing component 312 appends to the image data the results of this determination. This appended information is hereinafter referred to as attribute data. The details of the processing performed by the scanner image processing component 312 are to be hereinafter described.

A compression component 313 receives image data from the scanner image processing component 312 and divides it into block units of 32 pixels by 32 pixels. This 32-pixel by 32-pixel image data is hereinafter referred to as tile data.

Figure 4:
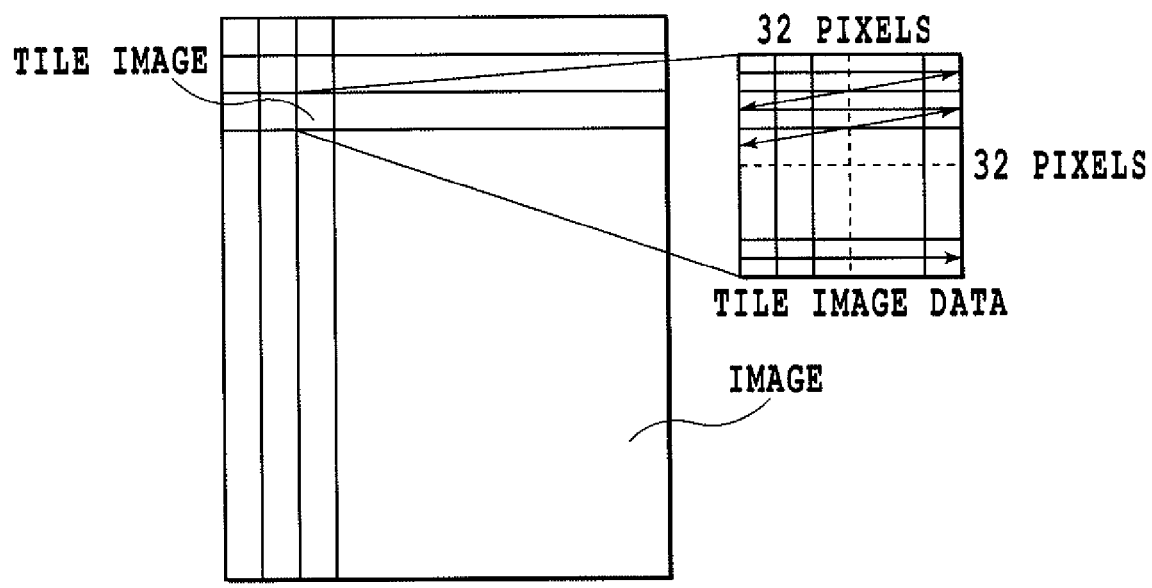
FIG. 4 is a diagram conceptually illustrating tile data.

FIG. 4 is a diagram conceptually illustrating tile data.

In the pre-scan original document, the areas corresponding to individual tile data are hereinafter referred to as tile images. Information such as average luminance information over a 32×32 pixel block and tile image coordinates within the original document are appended as header information.

The compression component 313 compresses the image data composed of a plurality of tile data. A decompression component 316, after decompressing the image data composed of a plurality of tile data, rasterizes the data and sends it to a printer image processing component 315.

The printer image processing component 315 receives the image data sent from the decompression component 316 and executes image processing on the image data while referring to the accompanying attribute data. After processing, the image data is output to the printer 14 via the printer interface 314. The details of the processing performed by the printer image processing component 315 are to be hereinafter described.

An image conversion component 317 executes predetermined conversion processing on the image data. The image conversion component 317 is provided with a decompression component 318, a compression component 319, a rotation component 320, a scaling component 321, a color space conversion component 322, a bi-level to multi-level conversion component 323, a multi-level to bi-level conversion component 324, a moving component 325, a sampling component 326, and a composite component 327.

The decompression component 318 decompresses received image data. The compression component 319 compresses received image data.

The rotation component 320 rotates received image data.

The scaling component 321 performs resolution conversion processing on received image data (for example, converting from 600 dpi to 200 dpi).

The color space conversion component 322 converts the color space of received image data. Using a matrix or table, the color space conversion component 322 performs the well-known background removal processing technique, the well-known RGB→CMY log conversion processing technique (RGB→CMY), or alternatively the conversion component performs the well-known output color correction processing technique (CMY→CMYK).

The bi-level to multi-level conversion component 323 converts received 2-level image data into 256-level image data. Conversely, the multi-level to bi-level conversion component 324 converts received 256-level image data into 2-level image data using techniques such as error diffusion processing.

The composite component 327 combines two received image data sets to generate a single set of image data. When combining two sets of image data, post-composition pixel luminance values may be determined by applying a method wherein the luminance values of pixels to be composite are averaged, or a method wherein the brightest luminance value among the pixels to be composite is used. Alternatively, it is also possible to apply a method wherein the darkest luminance value is used. Furthermore, it is also possible to determine post-composition luminance values by applying methods using logical operations such as OR operations, multiply-accumulate operations, and exclusive OR operations. Each of these composition methods are well-known techniques to those skilled in the art.

The sampling component 326 converts the resolution of received image data by pixel sampling, generating image data at scales such as ½, ¼, and ⅛. The moving component 325 adds/deletes marginal whitespace to/from received image data.

A raster image processor (RIP) 328, receiving intermediate data generated according to page description language (PDL) code data and sent from a source such as the PC 40 (FIG. 1), generates multi-level bitmap data.

Figure 5:
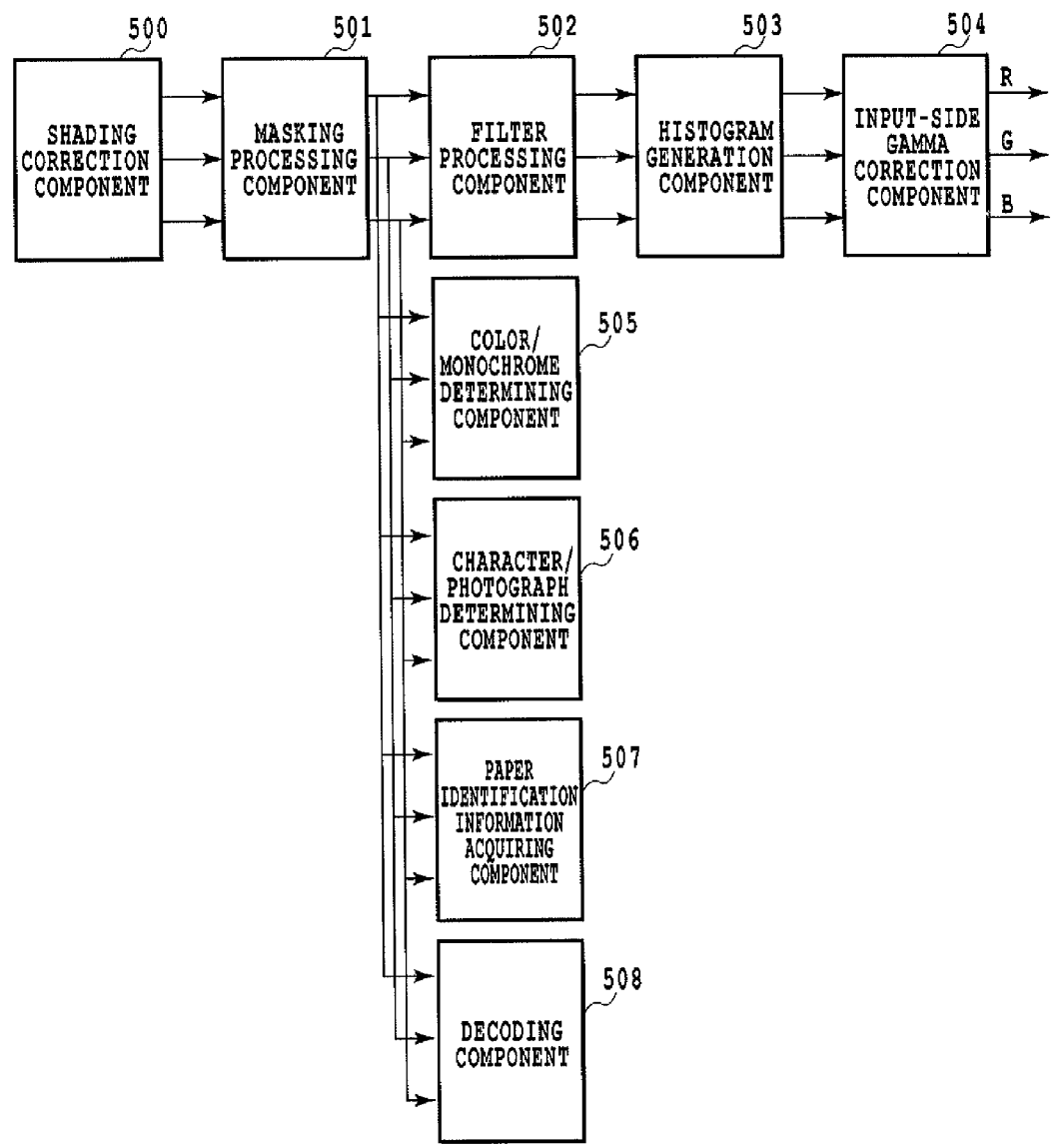
FIG. 5 is a diagram showing the configuration of a scanner image processing component.

FIG. 5 is a block diagram showing the configuration of a scanner image processing component 312.

The scanner image processing component 312 is provided with a shading correction component 500, a masking processing component 501, a filter processing component 502, a histogram generating component 503, and an input-side gamma correction component 504. The scanner image processing component 312 is furthermore provided with a color/monochrome determining component 505, a character/photograph determining component 506, a paper fingerprint information acquiring component 507, and a decoding component 508.

The shading correction component 500 receives image data as an RGB signal constituted by separate 8-bit luminance signals. The shading correction component 500 performs shading correction on the luminance signals. Shading correction is a processing technique which prevents incorrect recognition of original document brightness as a result of the variability in CCD sensitivities. In addition, the shading correction component 500 is also capable of performing gain adjustment according to instructions from the CPU 301 (FIG. 3).

The masking processing component 501 converts the luminance signals into standard luminance signals independent of CCD filter color.

Figure 7:
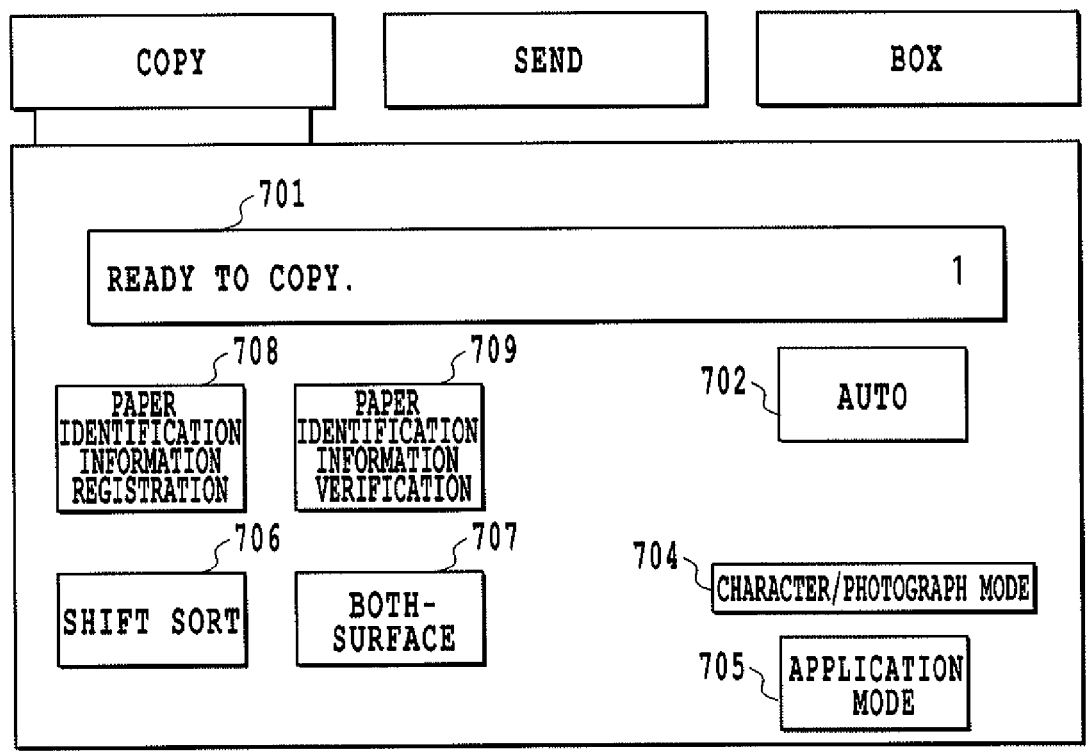
FIG. 7 is a diagram showing an example of a print setting screen.

The filter processing component 502 optionally corrects the spatial frequency of received image data. The filter processing component 502 operates on received image data using, for example, a 7×7 matrix. In a photocopying machine or multi-function device, copy modes such as a character mode, a photograph mode, or a combined character/photograph mode may be selected as the copy mode by pressing a character and photograph tab button 704 (FIG. 7). In the case where the user selects the character mode, the filter processing component 502 applies a character filter to the entirety of the image data. Alternatively, in the case where the user selects the photograph mode, the filter processing component 502 applies a photograph filter to the entirety of the image data. Furthermore, in the case where the user selects the combined character/photograph mode, the filter processing component 502 adaptively switches the filter for each pixel according to a character/photograph determination signal (one portion of the attribute data), to be hereinafter described. In other words, in the combined character/photograph mode, the decision to apply the photograph filter or the character filter is decided for each pixel individually. Furthermore, the photograph filter is set with coefficients such that only the high frequency portion of the data is smoothed. The reason for this is to make rough portions of images less conspicuous. Additionally, the character filter is set with coefficients such that edges are strongly accentuated. The reason for this is to bring out character sharpness.

The histogram generating component 503 performs luminance data sampling of each pixel constituting the received image data. In other words, the histogram generating component 503 samples luminance data at a fixed pitch in the main-scanning and sub-scanning directions, the luminance data being in the rectangular region enclosed by the scanning start and end points defined for both the main-scanning direction and the sub-scanning direction. Subsequently, the histogram generating component 503 generates histogram data based on the sampling results. The generated histogram data is used to estimate the background level in the case where background removal processing is performed.

The input-side gamma correction component 504 uses a table or other means to convert the histogram data into non-linear luminance data.

The color/monochrome determining component 505 determines for each pixel constituting the received image data whether the pixel is colored or uncolored, and appends the results to the image data as a color/monochrome determination signal (one portion of the attribute data).

The character/photograph determining component 506 determines for each pixel constituting the received image data whether the pixel is a pixel constituting character, a halftone dot, character within a halftone dot, or a solid image. The character/photograph determining component 506 makes determinations based on the pixel values of both the pixel itself and its surrounding pixels. Pixels which do not apply to any of the above categories are determined to be pixels constituting whitespace. Subsequently, the character/photograph determining component 506 appends the results to the image data as a character/photograph determination signal (one portion of the attribute data).

The paper fingerprint information acquiring component 507 extracts image data from within a specified region of the RGB image data output from the masking processing component 501.

The decoding component 508, in the case where there exists coded image data in the image data output from the masking processing component 501, decodes the coded image data.

Paper Fingerprint Information Acquisition

Figure 8:
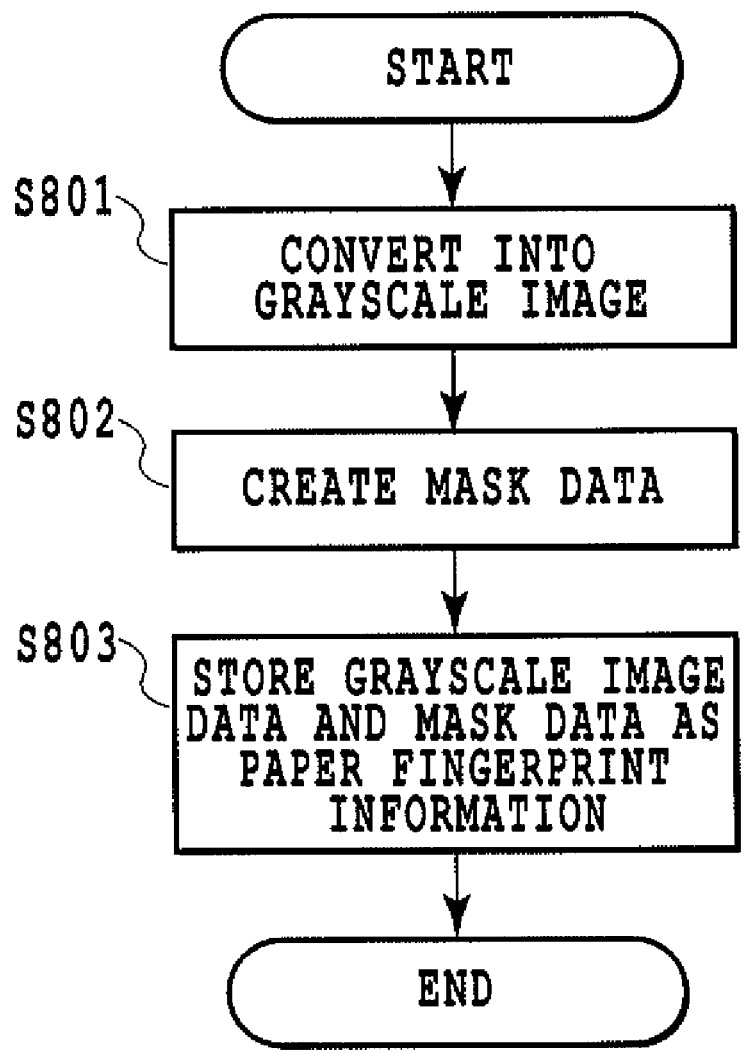
FIG. 8 is a flowchart showing details of paper fingerprint information acquisition processing, executed by a paper fingerprint information acquiring component.

FIG. 8 is a flowchart showing details of paper fingerprint information acquisition processing, executed by the paper fingerprint information acquiring component 507.

In step S801, the acquired specified region of the image data is converted into grayscale image data.

In step S802, mask data is created with regards to the image data. Mask data is data in a region of the image converted into grayscale data in step S801 from which objects that cause determination errors, such as printed or hand-written character, have been removed. Mask data is used for extracting paper fingerprint data for verification purposes. Mask data is 2-level data consisting of values equal to 0 or 1. In the grayscale image data, pixels whose luminance signal values exceed the first threshold value, i.e., bright pixels, are assigned a mask data value of 1. Conversely, pixels whose luminance signal values do not exceed the first threshold value are assigned a mask data value of 0. This assignment of data values is executed for all pixels included in the grayscale image data.

In step S803, the image data converted into grayscale in step S801 and the mask data created in step S802 are saved in the RAM 302 (FIG. 3) as paper fingerprint information.

Figure 6:
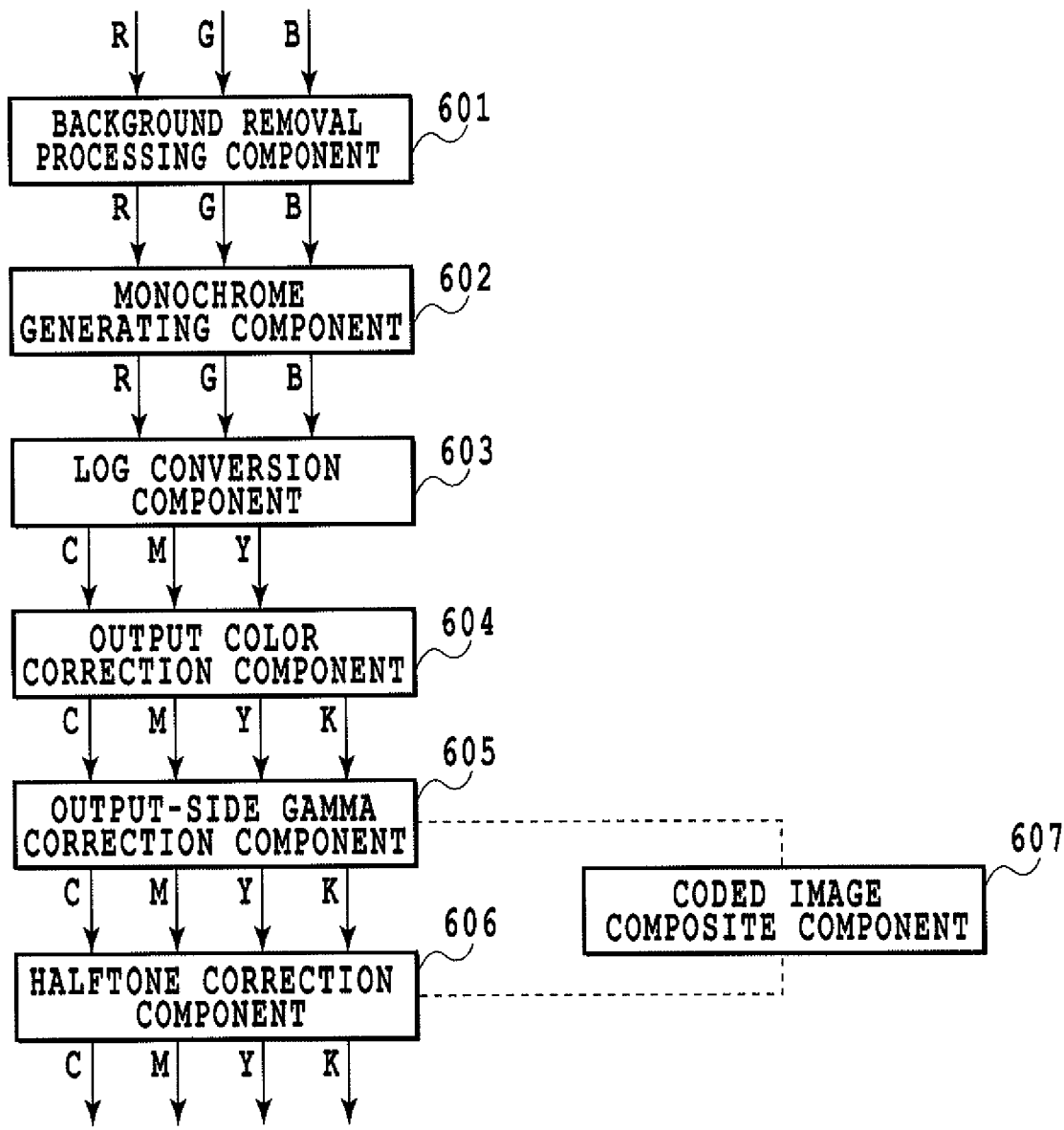
FIG. 6 is a flowchart showing the processing details of a printer image processing component.

FIG. 6 is a flowchart showing the processing details of a printer image processing component 315.

Data input into the printer image processing component 315 may comprise RGB data output by the scanner image processing component 312 via the compression component 313, or CMYK data output by the RIP 328 via a compression component 329. In the former case, RGB data is input into a background removal processor 601, while in the second case, CMYK data is input into an output-side gamma correction component 605.

The background removal processor 601, using the histogram created by the scanner image processing component 312, removes background color in the image data.

A monochrome generator 602 converts color data into monochrome data.

A log (logarithmic) conversion component 603 performs luminance density conversion. The log conversion component 603 converts, for example, RGB image data into CMY image data.

An output color correction component 604 performs color correction on output color. The output color correction component 604 converts, for example, CMY image data into CMYK image data using a table or matrix.

The output-side gamma correction component 605 performs correction such that signal values of the image data input into the correction component are proportional to the reflection density values of the printed image after being output from the photocopying machine.

A coded image composite component 607 creates composite image data by compositing the image data corrected by the output-side gamma correction component 605 with the coded image data created by paper fingerprint information encoding processing, to be hereinafter described.

Paper Fingerprint Information Encoding Processing

Paper fingerprint information encoding processing is the process whereby the CPU 301 (FIG. 3) reads out a specified region of the paper fingerprint information saved in the RAM 302 (FIG. 3) in step S803 shown in FIG. 8, and then executes encoding processing to generate coded image data. It should be appreciated that, in the specification of the present invention, a coded image indicates a two-dimensional code image, a barcode, or other image. The CPU 301 furthermore controls the sending of the generated coded image data to the coded image composite component 607 (FIG. 6) inside the printer image processing component 315 (FIG. 3). Coordinate information indicating a location (coordinate) in the paper where paper fingerprint information was extracted is inserted into the coded image.

It should be appreciated that the above-described generation control and sending control of coded image data is performed as a result of the execution of a program or programs stored in the RAM 302.

A halftone correction component 606 performs halftone correction processing so as to match the number of color levels output by the printer 14. For example, the halftone correction component 606 adjusts the high color level of received image data to a 2-level or 32-level format.

It should be appreciated that members such as the scanner image processing component 312 and the printer image processing component 315 may also simply output received image data as-is.

Paper Sheet Transport Control

The above-described paper fingerprint information encoding processing, coded image compositing, halftone correction, and sending of composite image data to the printer 14 needs to be completed within a specified amount of time. In other words, the above-described processing needs to be completed in the time beginning when a paper sheet passes through the paper fingerprint scanning sensor 1005 (FIG. 10) and the paper fingerprint information scan processing is begun, and ending when composite images date is printed on the paper sheet at the image creation component 1002 (FIG. 10). That is to say, the sending of the composite image data to the printer 14 needs to be completed after the paper sheet passes through the paper fingerprint scanning sensor 1005 and before the sheet is fed to the image creation component 1002. In order to satisfy the above conditions, the transport of the paper sheet is halted until the sending of the composite image data to the printer 14 has been completed. After the paper fingerprint data is scanned, the control component 11 issues to the paper sheet transport control component (not shown in the drawings) instructions to halt paper sheet transport temporarily. This paper sheet transport control component is provided in the interior of the paper feed/transport component 1004 and controls the transport of paper sheets. The paper sheet transport control component, upon receiving instructions to halt paper sheet transport, halts paper sheet transport. Subsequently, when the above-described processing is completed, the composite image data is sent to the printer 14 via the interposed printer interface 314 (FIG. 3), and printing on the paper sheet becomes possible. When this condition occurs, the control component 11 issues to the paper sheet transport control component instructions to resume paper sheet transport. The paper sheet transport control component receives these instructions and resumes transport of the paper sheet.

Paper Fingerprint Information Verification Processing

The CPU 301 reads out the paper fingerprint information stored in the RAM 302 by the paper fingerprint information acquiring component 507, and verifies the paper fingerprint information (hereinafter referred to as paper fingerprint information A) against other paper fingerprint information. The other paper fingerprint information (hereinafter referred to as paper fingerprint information B) shall mean data included in coded image data (a two-dimensional code image, barcode, or other image data) or data registered on a server in advance.

Figure 9:
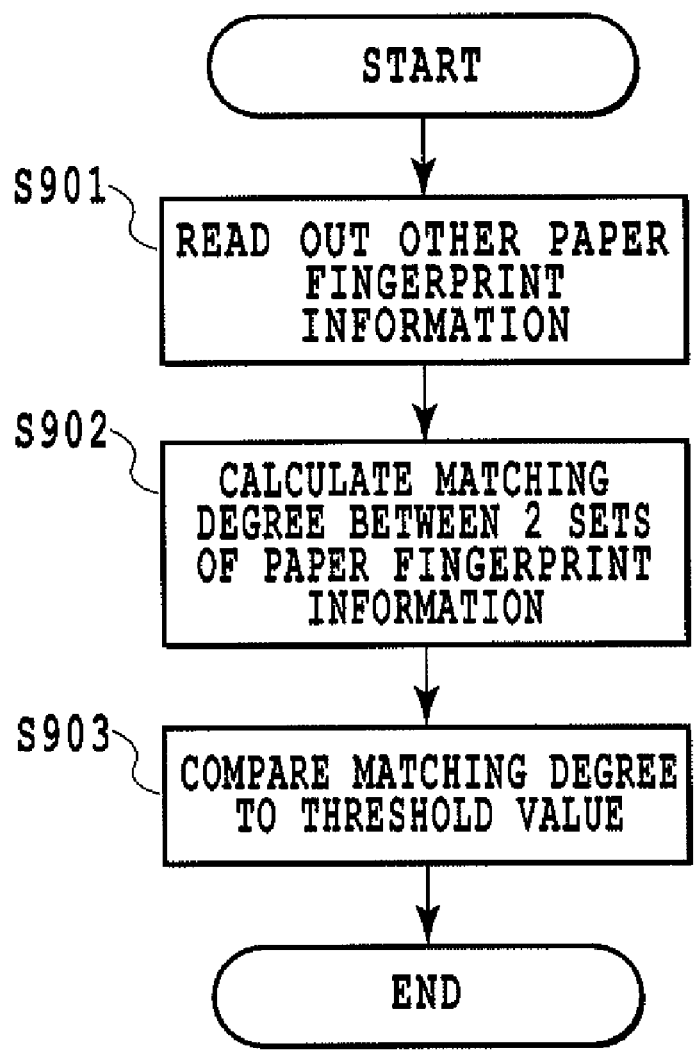
FIG. 9 is a flowchart showing details of paper fingerprint information verification processing.

FIG. 9 is a flowchart showing details of paper fingerprint information verification processing performed by the CPU 301.

In step S901, the CPU 301 reads out paper fingerprint information B. In step S902, the CPU 301 verifies paper fingerprint information A against paper fingerprint information B and calculates the matching degree. In step S903, the matching degree calculated in step S902 is compared to a specified threshold value and a verification result ("valid" or "invalid") is obtained. The matching degree is a value that shows the similarity between paper fingerprint information A and paper fingerprint information B.

Hereinafter, the specific method for calculating the matching degree shall be described with reference to FIGS. 16-19.

Figure 16:
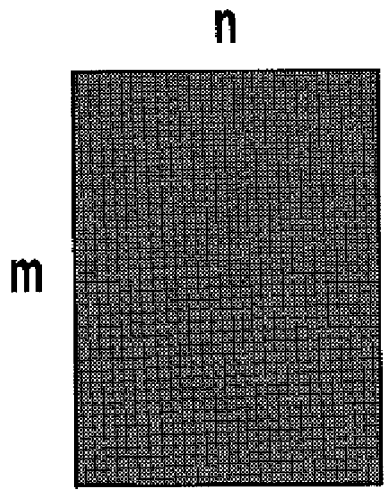
FIG. 16 is a diagram showing registered paper fingerprint information and recently-acquired paper fingerprint information.
Figure 16:
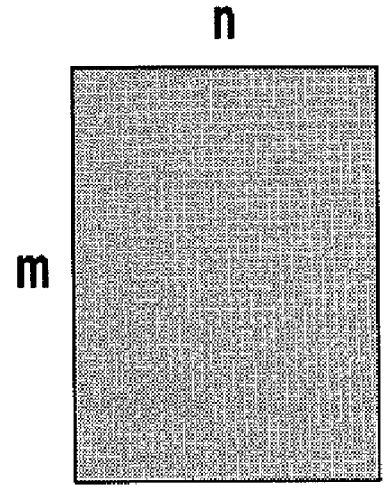

FIG. 16 illustrates paper fingerprint information A and B. Each set of paper fingerprint information is taken to be constituted by horizontal pixels n and vertical pixels m.

$$E(i, j) = \frac{\sum_{x,y} \alpha_1(x, y)\alpha_2(x-i, y-j)\{f_1(x, y) - f_2(x, y)\}^2}{\sum_{x,y} \alpha_1(x, y)\alpha_2(x-i, y-j)} \quad (1)$$

$E(i, j)$ represents the error value between paper fingerprint information A and B, where $\alpha_1$ is the mask data included in paper fingerprint information B, $f_1$ is the grayscale image data included in paper fingerprint information B, $\alpha_2$ is the mask data included in paper fingerprint information A, and $f_2$ is the grayscale image data included in paper fingerprint information A.

In equation (1), i and j are evaluated over the range $-n+1 \sim n-1$ and $-m+1 \sim m-1$, respectively, and each increments by one pixel, with $E(i, j)$ evaluating $(2n-1) \times (2m-1)$ iterations. In other words, $E(i, j)$ is evaluated over $E(-n+1, -m+1) \sim E(n-1, m-1)$.

Figure 17A:
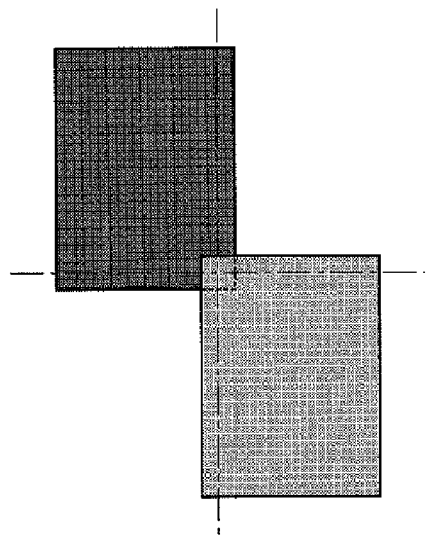
FIG. 17A is a diagram showing the determination of $E(-n+1, -m+1)$.

FIG. 17A shows a condition wherein the upper-left pixel of paper fingerprint information B overlaps the lower-right pixel of paper fingerprint information A. In this condition, the error value evaluated by equation (1) is given as $E(-n+1, -m+1)$.

Figure 17B:
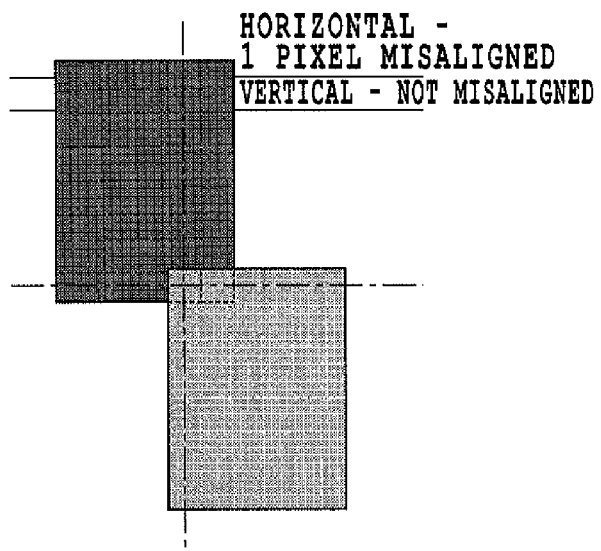
FIG. 17B is a diagram showing the determination of $E(-n+2, -m+1)$.
Figure 17C:
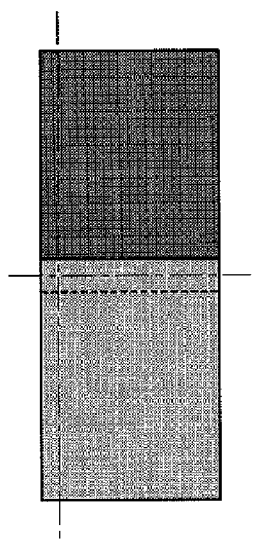
FIG. 17C is a diagram showing the determination of $E(0, -(m-1))$.
Figure 17D:
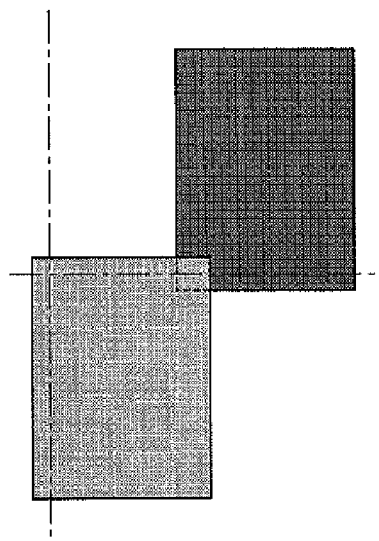
FIG. 17D is a diagram showing the determination of $E(n-1, -m+1)$.

FIG. 17B shows, in comparison to the condition in FIG. 17A, a condition wherein paper fingerprint information A has been moved one pixel to the right. In this condition, the error value evaluated by equation (1) is given as $E(-n+2, -m+1)$. In this way, the error value is calculated as paper fingerprint information A is moved one pixel to the right with respect to paper fingerprint information B with each iteration. FIG. 17C shows a condition wherein the lower row of pixels of paper fingerprint information A overlaps the upper row of pixels of paper fingerprint information B. In this condition, $E(i, j)$ is evaluated for $E(0, -(m-1))$. FIG. 17D shows a condition wherein paper fingerprint information A has been moved farther to the right, and the upper-right pixel of paper fingerprint information B overlaps the lower-left pixel of paper fingerprint information A. In this condition, $E(i, j)$ is evaluated for $E(n-1, -m+1)$. In this way, paper fingerprint information A is moved to right with respect to paper fingerprint information B, with i and j of $E(i, j)$ increasing by one.

Figure 18A:
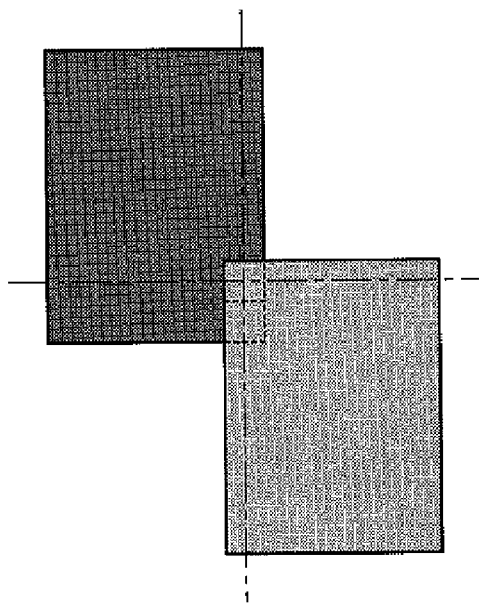
FIG. 18A is a diagram showing the determination of $E(-n+1, -m+2)$.

FIG. 18A shows, in comparison to the condition in FIG. 17A, a condition wherein paper fingerprint information A has been moved one pixel in the downwards direction with respect to paper fingerprint information B. In this condition, $E(i, j)$ is evaluated for $E(-n+1, -m+2)$.

Figure 18B:
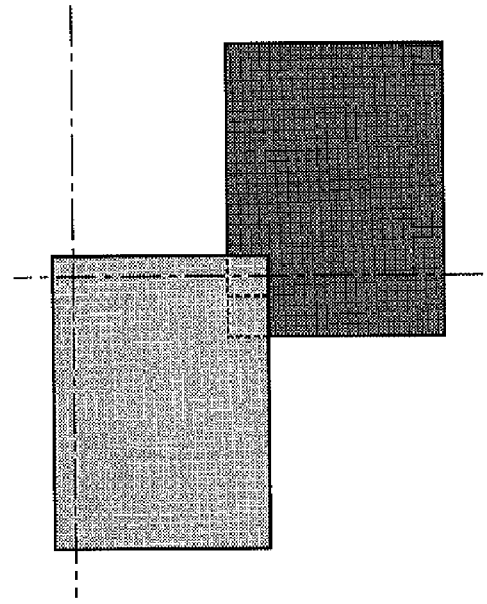
FIG. 18B is a diagram showing the determination of $E(n-1, -m+2)$.

FIG. 18B shows a condition wherein paper fingerprint information A has been moved to the right edge of paper fingerprint information B. In this condition, $E(i, j)$ is evaluated for $E(n-1, -m+2)$.

Figure 19A:
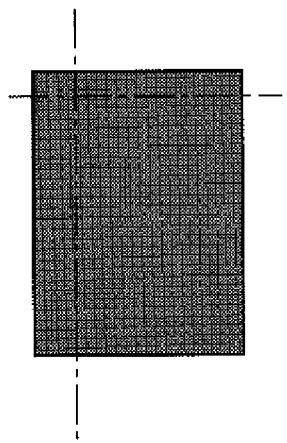
FIG. 19A is a diagram showing the determination of $E(0, 0)$.

FIG. 19A shows a condition wherein paper fingerprint information A and B are completely overlapped. In this condition, the error value is given as E(0, 0).

Figure 19B:
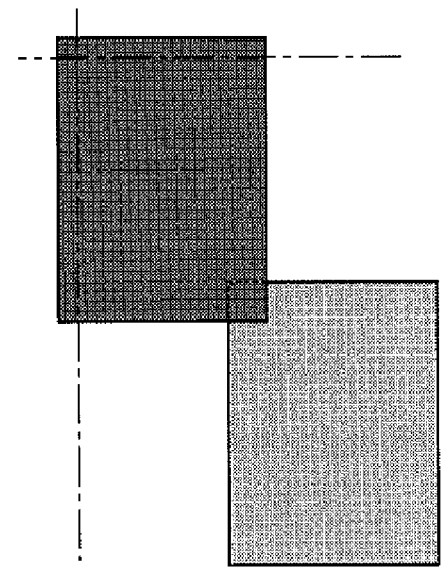
FIG. 19B is a diagram showing the determination of $E(n-1, m-1)$.

Finally, in the condition shown in FIG. 19B, E(i, j) is evaluated for E(n−1, m−1).

In this way, the sets of paper fingerprint information A and B are made to overlap for at least one pixel and error values are evaluated as the sets are moved, the result thereof being the acquisition of (2n−1)×(2m−1) error values.

In order to contemplate the meaning of the terms in equation (1), we will consider as an example the case wherein I=0, j=0, $\alpha_1$ (x, y)=1 (with x=0~n, y=0~m), and $\alpha_2$(x−I, y−j)=1 (with x=0~n, y=0~m). In other words, in this case equation (1) evaluates the E(0, 0) case. Setting I=0 and j=0 results in the case where paper fingerprint information A and B are completely overlapped, as shown in FIG. 19A.

$\alpha_1$ (x, y)=1 (with x=0~n, y=0~m) indicates that every pixel in the set of paper fingerprint information B is bright. Stated differently, when paper fingerprint information B was acquired, there was absolutely no dirt or color material such as ink or toner on the paper sheet in the paper fingerprint acquisition region.

$\alpha_2$(x−i, y−j)=1 (with x=0~n, y=0~m) indicates that every pixel in the set of paper fingerprint information A is bright. Stated differently, when paper fingerprint information A was acquired, there was absolutely no dirt or color material such as ink or toner on the paper sheet in the paper fingerprint acquisition region.

When $\alpha_1$ (x, y)=1 and $\alpha_2$(x−i, y−j)=1 hold true for all pixels, equation (1) becomes $$E(0, 0) = \sum_{x=0, y=0}^{n, m} \{f_1(x, y) - f_2(x, y)\}^2.$$

$\{f_1 (x, y)-f_2(x, y)\}^2$ evaluates to a double value that gives the difference between the grayscale image data in paper fingerprint information A and the grayscale image data in paper fingerprint information B. Consequently, equation (1) yields a sum over the double values of the differences between the grayscale image data for every pixel pair in paper fingerprint information A and B. Therefore, E(0, 0) becomes a smaller value as $f_1$ (x, y) and $f_2$(x, y) become more similar.

The behavior of E(i, j) is similar for other values of i and j. As $f_1$ (x, y) and $f_2$(x, y) become more similar, E(i, j) yields a smaller value. The case wherein E(k, l)=min{E(i, j)} indicates that the position of paper fingerprint information A during acquisition was misaligned with the position of paper fingerprint information B during acquisition by an offset k, l.

<Significance of $\alpha$>

Equation (1) yields a value for the sum of the product of $\{f_1 (x,y)-f_2(x-i,y-j)\}^2$, $\alpha_1$, and $\alpha_2$. $\alpha_1$ and $\alpha_2$ give values of 0 for dark-color pixels, and 1 for light-color pixels. Consequently, in the case where at least one of $\alpha_1$ and $\alpha_2$ is 0, $\alpha_1\alpha_2 \{f_1 (x, y)-f_2(x-i, y-j)\}^2$ becomes 0. In other words, in the case where at least one of the pixels in a pixel pair from paper fingerprint information A and B is a dark color, the brightness difference of the pixel pair is not considered. The reason for this is to ignore pixels corresponding to areas of the paper sheet whereupon dirt or color materials have adhered.

In order to adjust the result of the sum over the Σ term, the numerator is normalized by dividing it by Σ $\alpha_1$ (x, y)$\alpha_2$(x−i, y−j). It should be appreciated that error value of E(i, j) when the denominator is equal to 0 is not included in the set of error values {E(−(n−1), −(m−1)), E((n−1), (m−1))} hereinafter described.

Matching Degree Calculation Method

As described above, in the case where E(k, l)=min{E(i, j)}, the position of paper fingerprint information A during acquisition is misaligned with the position of paper fingerprint information B during acquisition by an offset k, l.

Continuing in the same manner, the matching degree between paper fingerprint information A and B is calculated using E(k, l) and E(i, j).

First, a set of error values is calculated using equation (1) (for example, E(0, 0)=10, E(0, 1)=50, E(1, 0)=50, E(1, 1)=50). From this set, a mean value (=40) is found (A). Next, the mean value (=40) is subtracted from each error value in the set (10, 50, 50, 50), yielding a new set of error values (30, −10, −10, −10) (B). Next, the standard deviation of this new set of error values is calculated (30×30+10×10+10×10+10×10=1200, 1200/4=300, √300=10√3≈17). Next, the new set of error values is divided by standard deviation (=17), yielding a quotient set (1, −1, −1, −1) (C). Next, the largest value in the calculated quotient set (=1) is taken as the matching degree. It should be appreciated that this value (=1) corresponds to E(0, 0)=10. In this example, E(0, 0)=min{E(i, j)}.

<Conceptual Description of Paper Fingerprint Information Verification Processing>

Paper fingerprint information verification processing consists of selecting from a plurality of error value sets the set with the smallest error values, calculating the mean error value and deviation from the mean for the set, calculating the matching degree by dividing the subtracted set by the standard deviation, and obtaining a verification result by comparing the matching degree to a threshold value. Standard deviation is an average value (the root mean square) of the deviation of a set of values from their arithmetic mean. In other words, the standard deviation is a measure of the deviation (spread) of error values in a set. By dividing these deviation values by the standard deviation, it is possible to ascertain if the minimum, min {E(i, j)}, of the set E(i, j) is a small value compared to other values in the set. If the minimum value is small compared to other values in the set, then the verification result is "valid", and if and the minimum value is not small compared to other values in the set, then the result is "invalid".

<Reason Why Verification is Valid Only in the Case Where min {E(i, j)} is Small Compared to Other Values in the Set E(i, j)>

Assume that paper fingerprint information A and B were acquired from the same paper sheet. In that case, there should be a location wherein paper fingerprint information A and B match exceedingly well. In that location, the value of E(i, j) becomes extremely small. Conversely, by deviating only slightly from this location, the association between paper fingerprint information A and B is lost, and the value of E(i, j) becomes large. In short, the condition stipulating that two sets of paper fingerprint information be acquired from the same paper sheet is consistent with the condition stipulating that the smallest value of E(i, j) in the set of E(i, j) values be small compared to other values in the set.

Printer Driver Setting Screen

Hereinafter, print jobs accompanied by registration of the paper fingerprint of paper sheets will be described.

Figure 11:
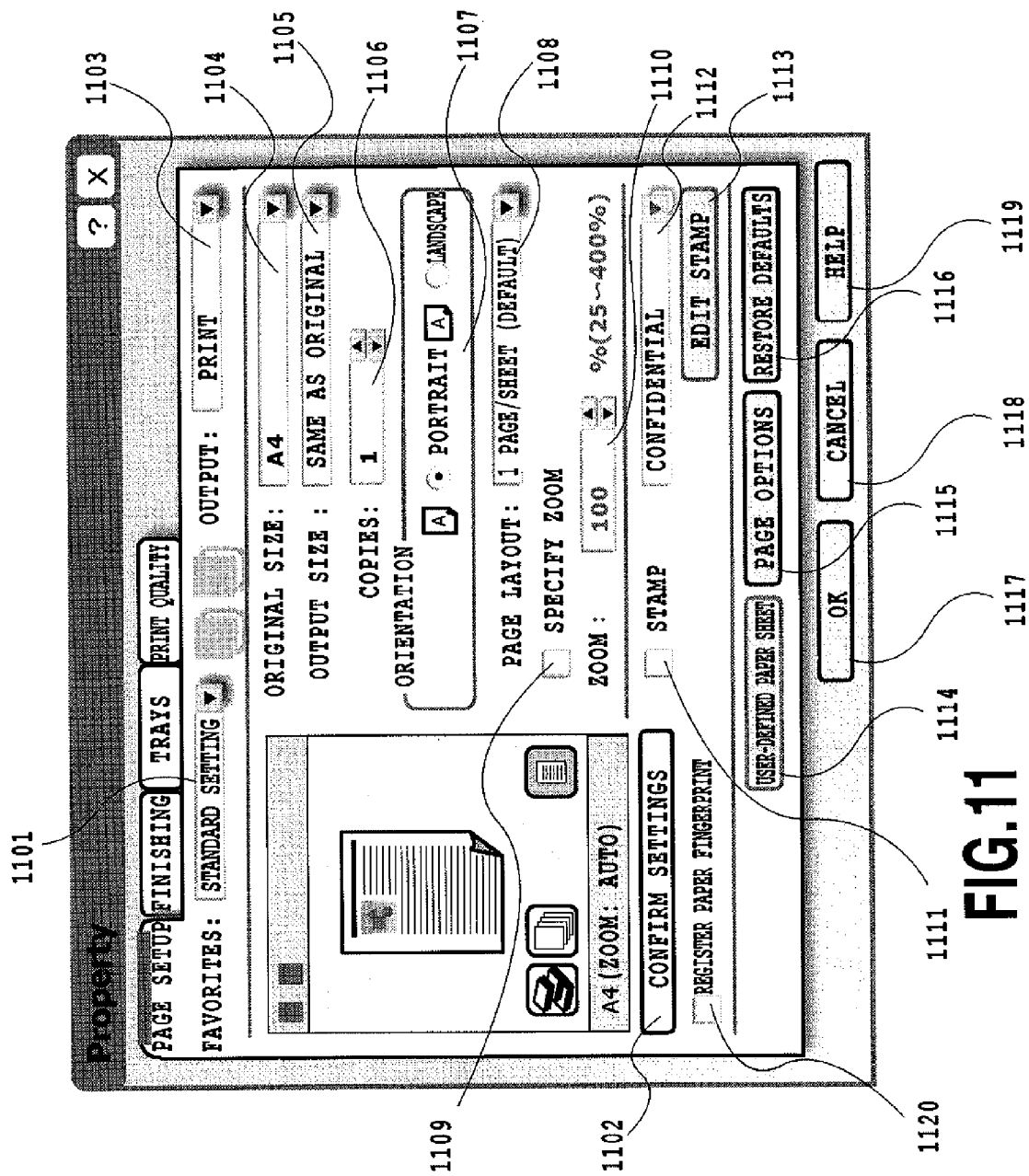
FIG. 11 is a view showing an example of a property setting screen relating to page setting processing in a printer driver.

FIG. 11 is a view showing an example of a property setting screen relating to page setting processing in a printer driver. The screen is manipulated by touch panel operation.

In a pull-down list box 1101 which may specify "Favorites", optimal page setting is selected from among available page setting modes set in advance. In the present example, standard setting mode is selected.

By touching a "Confirm settings" button 1102, a list of the options set from the property setting screen may be displayed. The options set from the property setting screen are reflected in the page image displayed above the "Confirm settings" button 1102.

In a pull-down list box 1103 which may specify "Output methods", print job output methods, such as normal or secure printing from the printer of an MFP or other device, storage of the job in the printer's hard disk, or execution of editing and previewing at the printer, are specified.

In a pull-down list box 1104 which may specify "Original document size" and a pull-down list box 1105 which may specify "Output paper sheet size", respectively, the page size of the original document to be printed and the output paper sheet size are selected.

In a spin box 1106 which may specify "Copies", the number of desired copies to be printed is input.

In a radio buttons 1107 which may specify "Printing orientation", the orientation of the paper sheets output from the printer, being either "Portrait" or "Landscape", is selected.

In a pull-down list box 1108 which may specify "Page layout", N-up printing options (a family of printing options whereby a plurality of pages are laid out and printed on a single paper sheet) may be specified.

When a check box 1109 which may specify "Specify zoom" is in the checked state, enlargement and reduction factors, in units of percentage, may be input in a spin box 1110 which may specify "Zoom".

When a check box 1111 which may specify "Stamp" is in the checked state, predetermined varieties of print stamps may be selected from a pull-down list box 1112. By touching an "Edit Stamp" button 1113, stamps may be added or edited.

By touching a "User-defined paper sheet" button 1114, user-defined paper sheet sizes may be defined. In addition, by touching a "Page Options" button 1115, more advanced page options may be configured. Alternatively, by touching a "Restore Defaults" button 1116, these page options may be restored to their default values.

When the user completes the setting of print options on the property setting screen of the printer driver, the user touches an "OK" button 1117. As a result, the set printing attributes are applied to actual print jobs. A "Cancel" button 1118 is touched when stopping the setting of options on the property setting screen. A "Help" button 1119 displays the help screen of the property setting screen.

A check box 1120 which may specify "Register Paper fingerprint" is provided for the purpose of selecting the paper fingerprint information registration processing.

Print Processing of Image Data, Including Paper Fingerprint Information

FIG. 7 is a diagram showing an example of a print setting screen. The screen is manipulated by touch panel operation.

Hereinafter, a description of device operation in the case where the "Register Paper ID" check box 1120 is selected by the user, and furthermore wherein the start key is touched after the paper finger print information registration button 708 on the print setting screen shown in FIG. 7 is touched by the user, will be discussed with reference to FIG. 12.

Figure 12:
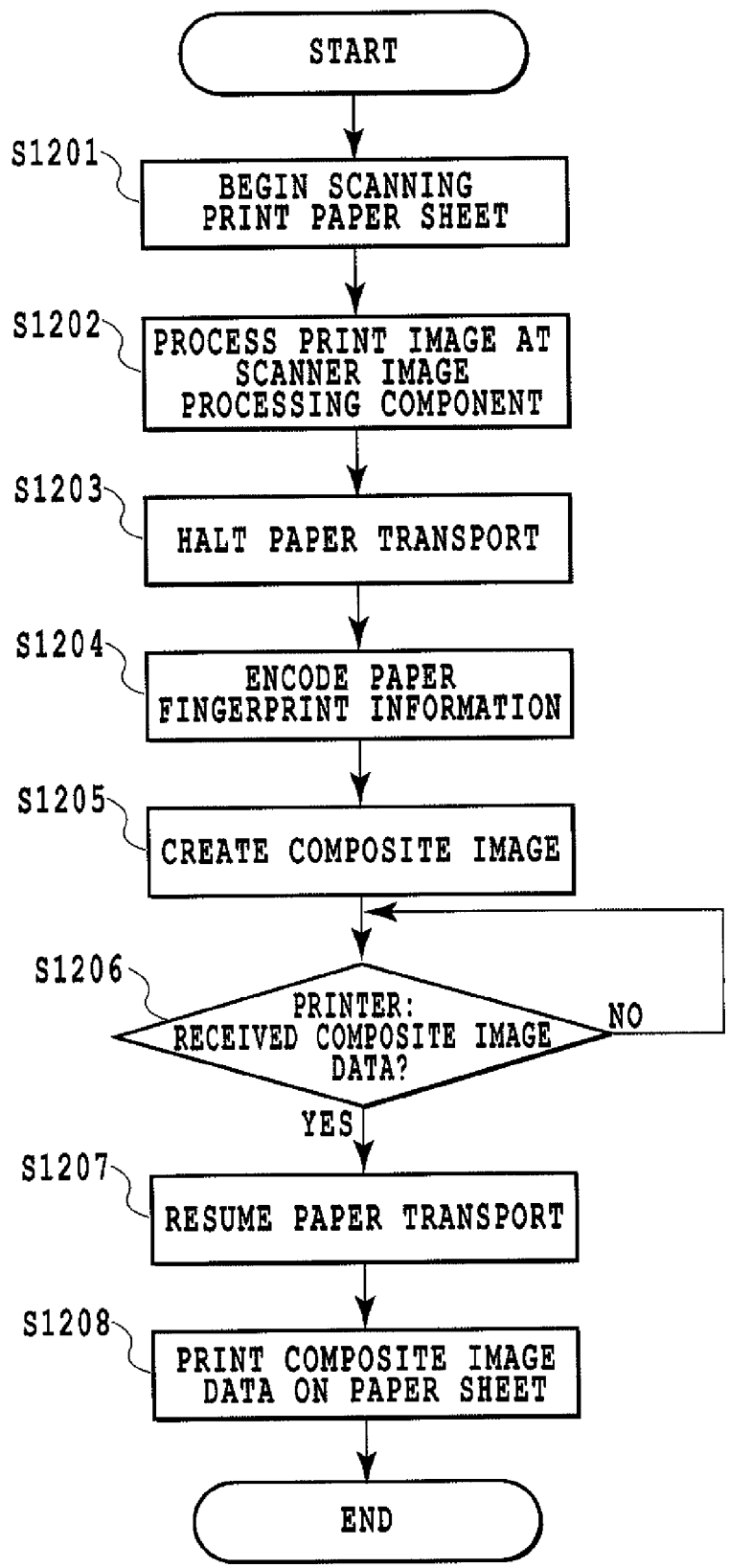
FIG. 12 is a flowchart showing details of the print processing of image data, including paper fingerprint information, in the one-side printing case.

FIG. 12 is a flowchart showing details of the print processing of image data, including paper fingerprint information.

Referring to FIG. 12, in step S1201, the paper sheet is transported and the paper fingerprint scanning sensor 1005 commences scanning of print paper sheets (the paper sheets to be used as the original document). The CPU 301 controls the sending of image data scanned by the paper fingerprint scanning sensor 1005 to the scanner image processing component 312 via the interposed scanner interface 311.

In step S1202, the scanner image processing component 312 executes image processing on the print image or images. More specifically, the scanner image processing component 312 configures the shading correction component 500 with typical gain adjustment values, executes image processing on the image data acquired by scanning the paper as shown in FIG. 5, and generates new image data along with attribute data. Alternatively, the scanner image processing component 312 appends attribute data to the image data. Furthermore, the scanner image processing component 312 configures the shading correction component 500 with smaller-than-typical gain adjustment values. Then, the scanner image processing component 312 applies the small gain adjustment values to the image data and outputs the respective luminance signal values acquired thereby to the paper fingerprint information acquiring component 507. Subsequently, based on the received output data, the paper fingerprint information acquiring component 507 acquires paper fingerprint information, and sends the acquired information to the RAM 302 via the data bus (not shown in the drawings).

In step S1203, as described in the foregoing component on paper sheet transport control processing, paper sheet transport is halted.

In step S1204, the CPU 301 encodes the paper fingerprint information, generates coded image data (e.g., a two-dimensional barcode), and controls the sending of the generated coded image data to the coded image composite component 607 inside the printer image processing component 315.

In step S1205, the printer image processing component 315 creates a composite image. In other words, the printer image processing component 315, following the processing sequence shown in FIG. 6, performs editing of the image data according to the attribute data appending to the image data. In step S1205, a composition of the coded image data generated in step S1204 and the original document image data is executed. In other words, the coded image composite component 607 composes the original document image data output from the output-side gamma correction component 605 with the coded image data generated in step S1204. In addition, the halftone correction component 606 executes halftone processing on the composite image data acquired as a result of the composition, the halftone processing being matched to the number of color levels of the output printer 14. After halftone processing has been completed, the composite image data is sent to the printer 14 via the interposed printer interface 314.

In step S1206 the control component 11 determines whether the printer 14 received the composite image data. In other words, the control component 11 determines whether the encoding of the paper fingerprint information has been completed.

In step S1207, in the case where the printer 14 receives the composite image data, the control component 11 issues to the paper sheet transport control component instructions to resume paper sheet transport. The paper sheet transport control component, upon receiving the resume instructions, resumes paper sheet transport.

In step S1208, the printer 14 outputs the composite image data and the document data on the output paper sheets.

It should be appreciated that the processing sequence shown in FIG. 12 may be commenced by other procedures, for example in the case where the "Register Paper ID" check box shown in FIG. 11 is not checked but instead instructions are issued by the user from the button 708.

Alternatively, in the case where image data generated according to a PDL is sent from the PC 40 to be printed, paper fingerprint registration instructions are received as a result of the user checking the "Register Paper ID" check box shown in FIG. 11. At the point when the user issues the instructions by touching the "OK" button 1117, commands from the PC 40 are issued such that the image forming device commences the processing sequence as shown in FIG. 8.

When the image forming device receives the commands, the CPU of the control component 11 issues paper sheet transport instructions to the paper sheet transport control component, whereupon paper sheets are transported. The paper fingerprint scanning sensor 1005 scans the paper fingerprint and registers the data in the RAM 302, where the data is subsequently encoded.

Meanwhile, when instructions to print an image to be composite with paper fingerprint data are given to the printer driver installed into the PC 40, PDL data in accordance with the image is sent to the image forming device, rasterized by the RIP 328. A composition of the rasterized image and the encoded paper fingerprint data is subsequently executed to create a composite image. This composite image is subsequently output (printed) to the corresponding paper sheet from which the paper fingerprint data was scanned and encoded, following the sequence described in steps S1206-S1208.

Paper Fingerprint Information Verification Processing

Figure 15:
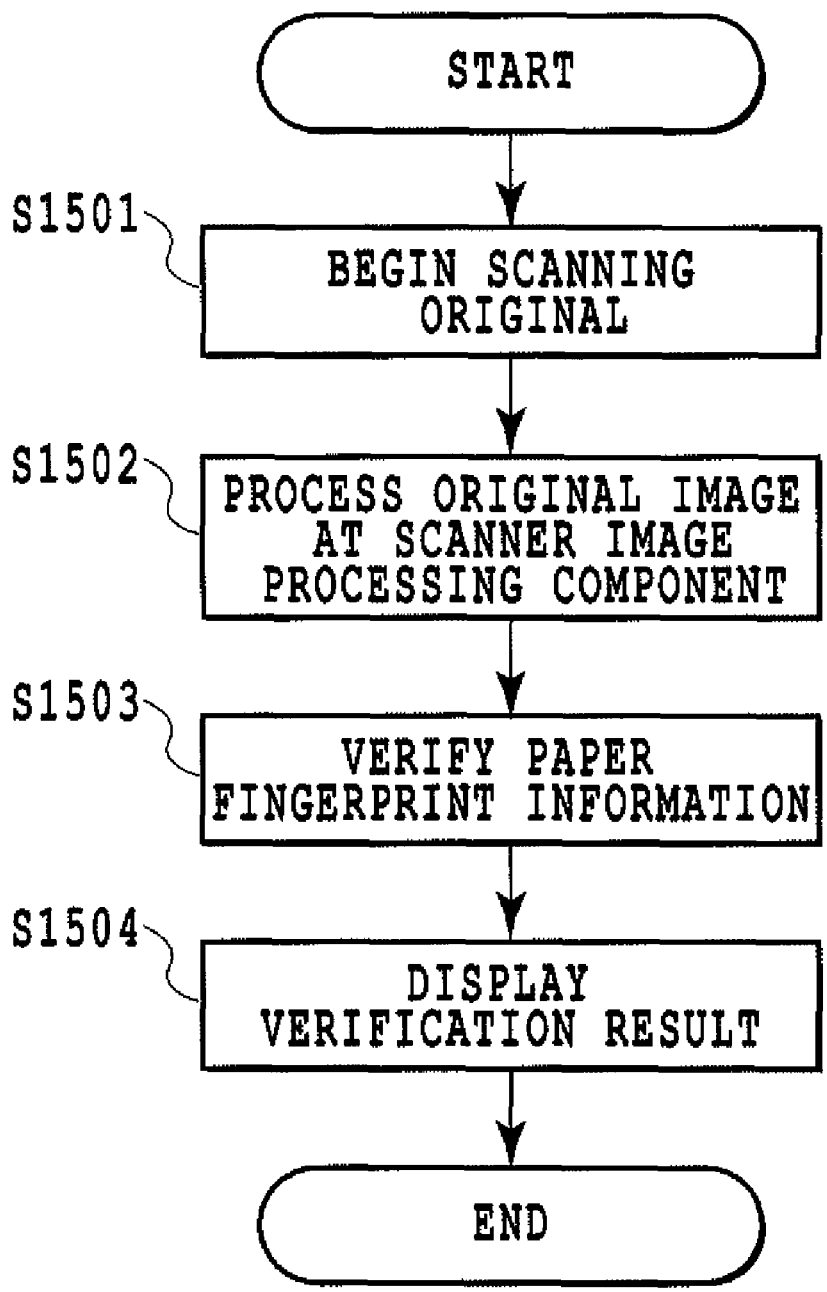
FIG. 15 is a flowchart showing details of paper fingerprint information verification processing.

Hereinafter, a description of device operation in the case where a paper fingerprint information verification button 709 on the print setting screen as shown in FIG. 7 is touched by the user, and furthermore wherein the start key is subsequently touched, will be discussed with reference to FIG. 15. FIG. 15 is a flowchart showing details of paper fingerprint information verification processing.

Referring to FIG. 15, in step S1501, the CPU 301 controls the sending of original document image data scanned by the scanner 13 to the scanner image processing component 312 via the interposed scanner interface 311.

In step S1502, the scanner image processing component 312, performs image processing on the original document image. The image processing is performed on the image data according to the processing sequence shown in FIG. 5, and new image data along with attribute data is generated. Alternatively, the attribute data is appended to the image data. In step S1502, the paper fingerprint information acquiring component 507 provided in the scanner image processing component 312 acquires paper fingerprint information. It should be appreciated that, as described above, the shading correction component 500 performs gain adjustment on the image data for the purpose of acquiring the paper fingerprint information. Subsequently, the paper fingerprint information acquiring component 507 sends the acquired data to the RAM 302 via the data bus (not shown in the drawings). Furthermore, in step S1502, in the case where coded image data (e.g., a two-dimensional barcode) exists, the decoding component 508 provided in the scanner image processing component 312 decodes the coded image data and acquires paper fingerprint information. Subsequently, the acquired information is sent to the RAM 302 via the data bus (not shown in the drawings)

In step S1503, the CPU 301 performs verification processing on the paper fingerprint information received from the paper fingerprint information acquiring component 507 and the paper fingerprint information acquired from the coded image data in accordance with the coordinate information acquired from the coded image. This paper fingerprint information verification processing has already been described with reference to FIG. 9.

In step S1504, the CPU 301 controls the display of the result (valid or invalid) obtained from the paper fingerprint information verification processing on the screen of the operation component 12.

Figure 13:
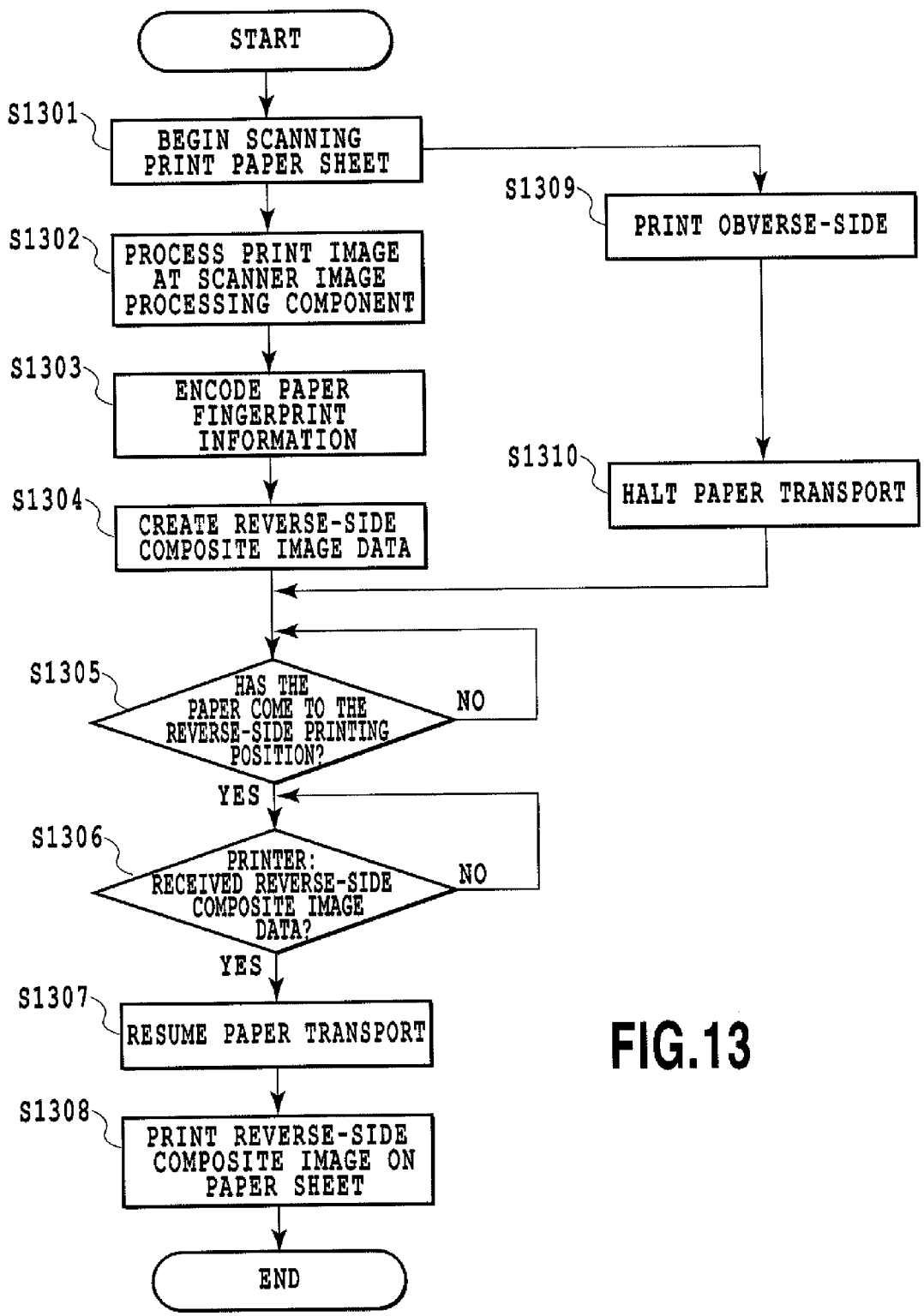
FIG. 13 is a flowchart showing details of the print processing of image data, including paper fingerprint information, in the both sides printing case.

Hereinafter, a second embodiment of the present invention will be described with reference to the processing involved in the both sides printing case as shown in FIG. 13.

In step S1301, the paper fingerprint scanning sensor 1005 commences scanning of print paper sheets (the paper sheets to be used as the original document). The CPU 301 controls the sending of image data scanned by the paper fingerprint scanning sensor 1005 to the scanner image processing component 312 via the interposed scanner interface 311. When step S1301 is completed, the processing in steps S1302 and S1309 commence simultaneously.

In step S1302, the scanner image processing component 312, upon setting the shading correction component 500 with typical gain adjustment values, executes image processing on the image data as shown in FIG. 5, and generates new image data along with attribute data. Alternatively, the scanner image processing component 312 appends attribute data to the image data. Furthermore, the scanner image processing component 312 sets the shading correction component 500 to smaller-than-typical gain adjustment values. Then, the scanner image processing component 312 applies the small gain adjustment values to the image data and outputs the respective luminance signal values acquired thereby to the paper fingerprint information acquiring component 507. Subsequently, based on the received output data, the paper fingerprint information acquiring component 507 acquires paper fingerprint information, and sends the acquired data to the RAM 302 via the data bus (not shown in the drawings).

In step S1303, the CPU 301 encodes the paper fingerprint information, generates coded image data (e.g., a two-dimensional barcode), and controls the sending of the generated coded image data to the coded image composite component 607 inside the printer image processing component 315. Coordinate information indicating a location (coordinate) in the paper where paper fingerprint information was extracted is inserted into the coded image.

In step S1304, the printer image processing component 315 executes editing of the image data according to the attribute data appended to the image data. This processing sequence is shown in FIG. 6. In step S1304, a composition of the coded image data generated in step S1303 and reverse-side image data is executed, thereby creating reverse-side composite image data. In other words, the coded image composite component 607 composites the reverse-side image data output from the output-side gamma correction component 605 and the coded image data generated in step S1303. Subsequently, the halftone correction component 606 performs halftone correction processing on the reverse-side composite image data so as to match the number of color levels output by the printer 14. The halftone-corrected reverse-side composite image data is then sent to the printer 14 via the interposed printer interface 314.

In step S1309, in printer 14, printing is executed on the obverse side (the first side) of the paper sheet.

In step 1310, the paper sheet on whose obverse-side printing has been executed is transported to the both-surface transport path and is halted just before the reverse-side printing position, that is, just before the image creation component 1002.

In step 1305, it is determined whether the paper sheet has been transported to just before the reverse-side printing position.

In step S1306, when the paper sheet has been transported to just before the reverse-side printing position, it is determined whether the receiving by the printer 14 of the reverse-side composite image data has been completed. In the case where the receiving by the printer 14 of the reverse-side composite image data has been completed, the processing sequence proceeds to step S1307.

In step S1307, the paper sheet transport halted in step S1310 is resumed.

In step S1308, the reverse-side composite image data is printed on the reverse side (the second side) of the paper sheet.

It should be appreciated that, in the case where one-side printing is executed on a plurality of paper sheets, the obverse-side printing in step S1309 is omitted. In other words, the paper sheets are passed immediately to the both-surface transport path without obverse-side printing thereupon.

Figure 14:
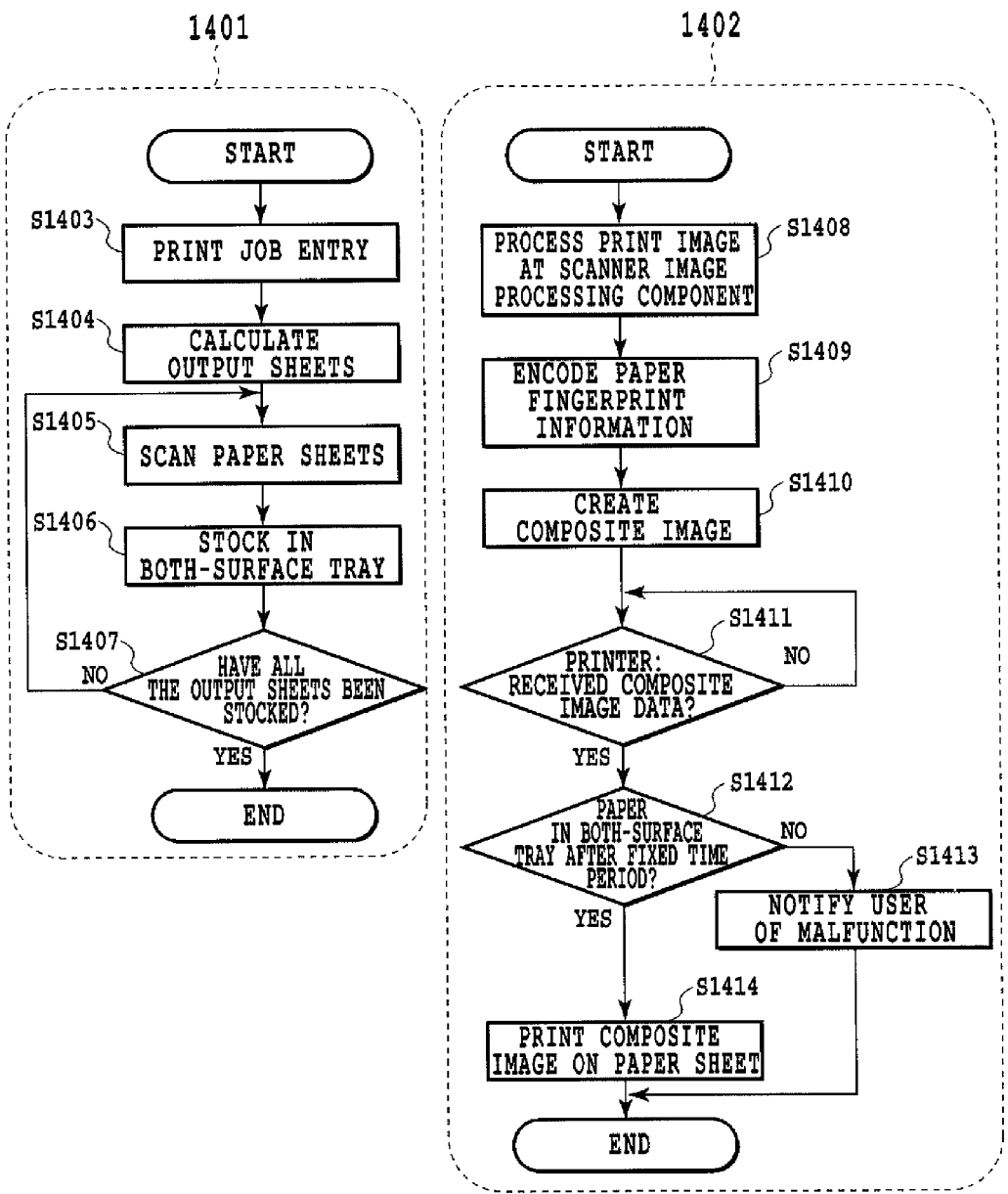
FIG. 14 is a flowchart of paper fingerprint scan processing and paper fingerprint data print processing.

Hereinafter, paper fingerprint scanning processing for a plurality of paper sheets and print processing in a third embodiment of the present invention will be described with reference to FIG. 14. Flowchart 1401 in FIG. 14 is a flowchart showing a paper fingerprint scan processing sequence, and flowchart 1402 in FIG. 14 is a flowchart showing a paper fingerprint data print processing sequence.

In step S1403 of the paper fingerprint scan processing flowchart 1401, a print job is submitted by the printer driver.

In step S1404, the necessary number of paper sheets to output the print job is calculated from the print job data. In step S1405, paper sheets are fed to the paper fingerprint scanning sensor 1005. The paper fingerprint scanning sensor 1005 scans paper fingerprint data from the paper sheets. In step S1406, the paper sheets are fed to and stocked in the both-surface tray. In step S1407, it is determined whether the number of paper sheets calculated in step S1404 has been stocked in the both-surface tray 1020. If the calculated number of paper sheets has been stocked, the processing sequence ends.

Meanwhile, the processing sequence of the paper fingerprint data print processing flowchart 1402 commences when the paper fingerprint data scanned in step S1405 is received as input.

The processing sequence executed in steps S1408, S1409, S1410, and S1411, being similar to that of steps S1202, S1204, S1205, and S1206 in FIG. 12, are omitted from the present description.

In step S1412, it is detected whether the paper from which paper fingerprint data was scanned is in the both-surface tray 1020. The processing is such that paper sheets are fed and stocked in the both-surface tray after paper fingerprint data is scanned. This means that if the paper sheets cannot be detected in the both-surface tray after a fixed period of time has elapsed, there is the possibility that a jam or other malfunction has occurred. In this case, the user is notified of the malfunction via the operation component 12. In the case where the paper sheets can be detected in the both-surface tray, the processing sequence proceeds to step S1414.

The processing executed in step S1414, being similar to that of step S1208 in FIG. 12, is omitted from the present description.

Additionally, as an application of the third embodiment of the present invention, the paper sheets may be first loaded into a paper tray, whereupon scanning of the paper fingerprint data is executed from an operation component, the paper sheets are fed and stocked in a both-surface tray, and the scanned paper fingerprint data is stored in the HDD 304. Subsequently, the print job may be entered, whereupon a composition of the document data and the paper fingerprint data is executed to create a composite image data which is then output.

Other Embodiments

The present invention may also be applied to a system comprising a plurality of devices (for example, computers, interface equipments, readers, and printers), or may be applied to device comprising a single equipment (multi-function (MFP) devices, printers, fax machines, or other devices).

The objects of the present invention are also achieved when a computer (or CPU or MPU) of the system or device reads and executes program code that realizes the procedure described in the flowcharts of the above-described embodiments, the program code being stored in a computer-readable recording medium, wherein the computer (or CPU or MPU) reads the program code from the medium. In this case, the program code itself, read from the recording medium, realizes the functions of the above-described embodiments. For that reason, program code and recording media recording program code constitute a further embodiment of the present invention.

For recording media for the purpose of providing program code, for example, Floppy® disks, hard disks, optical disks, magneto-optical disks, CD-ROM discs, CD-R discs, magnetic tape, non-volatile memory cards, or ROM memory may be used.

Alternatively, the functions of the above-described embodiments may be realized as a result of the program code being read and executed by the computer, whereby an operating system or other software running on the computer, according to instructions from the program code, all or part of the processing sequences of the above-described embodiments.

Additionally, the functions of the above-described embodiments may be realized by a function expansion board or function expansion component provided with memory and a CPU. In other words, the program code, being read from a recording medium, is written to the memory, whereupon the CPU or other processing component performs, according to instructions from the program code, all or part of the actual processing sequences and thereby the functions of the above-described embodiments may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328522, filed Dec. 5, 2006, which is hereby incorporated by reference herein in its entirety.

What is claimed is:

1. An image forming device, comprising:
a scanning component scanning image data from an output paper sheet;
an extracting component extracting paper fingerprint data from the image data;
an encoding component converting the paper fingerprint data into code data;
a printing component printing the code data and document data on the output paper sheet;
a determining component determining whether encoding of the paper fingerprint data has been completed; and
a paper sheet transport control component transporting the output paper sheet to the printing component after the encoding has been completed.

2. The image forming device as claimed in claim 1, further comprising:
a housing component housing the output paper sheet;
wherein the paper sheet transport control component transports the output paper sheet housed in the housing component to the printing component after the encoding has been completed.

3. An image forming device, comprising:
a scanning component, placed on a paper sheet transport path, scanning paper fingerprint data from a fed paper sheet;
a conversion component converting the paper fingerprint data into coded image data;
a generation component compositing document data and the coded image data to generate composite image data;
a printing component printing the composite image data on the paper sheet;
a transport component transporting the paper sheet to the printing component; and
a control component controlling transport of the paper sheet, the paper sheet being transported by the transport component;
wherein the control component, after the scanning of the paper fingerprint data and until the generation of the composite image data has been completed, halts transport of the paper sheet; and
wherein the control component, after the generation of the composite image data has been completed, resumes transport of the paper sheet to the printing component.

4. An image forming device, comprising:
a scanning component, placed on a paper sheet transport path, scanning paper fingerprint data on a first side of a fed paper sheet;
a conversion component converting the paper fingerprint data into coded image data;
a generation component compositing document data and the coded image data to generate composite image data;
a printing component printing the composite image data on the first side of the paper sheet;
a transport component transporting the paper sheet to the printing component; and
a control component controlling transport of the paper sheet, the paper sheet being transported by the transport component;
wherein the printing component, after the scanning of the paper fingerprint data, executes printing on a second side of the paper sheet;
wherein the control component, until the generation of the composite image data has been completed, halts transport of the paper sheet whose second side printing has been executed;
wherein the control component, after the generation of the composite image data has completed, resumes transport of the paper sheet whose second side has been printed to the printing component; and
wherein the control component controls printing of the composite image data on the first side of the paper sheet.

5. An image forming device, comprising:
a scanning component, placed on a paper sheet transport path, scanning paper fingerprint data on a fed paper sheet;
a memory component storing the paper fingerprint data;
a housing component housing the paper sheet from which paper fingerprint data has been scanned in a both-surface tray;
a conversion component converting the paper fingerprint data stored in the memory component into coded image data;
a generation component compositing document data and the coded image data to generate composite image data;
a printing component printing the composite image data on the paper sheet;
a transport component transporting the paper sheet to the printing component; and
a control component controlling transport of the paper sheet, the paper sheet being transported by the transport component;
wherein the control component, after the scanning of the paper fingerprint data, and furthermore after the generation of the composite image data has been completed, controls transport of the paper sheet housed in the both-surface tray to the printing component.

6. The image forming device as claimed in claim 3, further comprising:
a calculating component comparing and verifying paper fingerprint data scanned by the scanning component with coded image data contained in composite image data printed on a paper sheet to calculate similarity between the paper fingerprint data and the coded image data.

7. The image forming device as claimed in claim 4, further comprising:
a calculating component comparing and verifying paper fingerprint data scanned by the scanning component with coded image data contained in composite image data printed on a paper sheet to calculate similarity between the paper fingerprint data and the coded image data.

8. The image forming device as claimed in claim 5, further comprising:
a calculating component comparing and verifying paper fingerprint data scanned by the scanning component with coded image data contained in composite image data printed on a paper sheet to calculate similarity between the paper fingerprint data and the coded image data.

9. An image forming method, comprising the steps of:
scanning image data on an output paper sheet;
extracting paper fingerprint data from the image data;
converting the paper fingerprint data into code data;
printing the code data and document data on the output paper sheet, the printing being executed by a printing device;
determining whether encoding of the paper fingerprint data has been completed; and
transporting the output paper sheet to the printing device after the encoding has been completed.

10. An image forming method, comprising the steps of:
scanning image data on an output paper sheet;
housing the output paper sheet in a housing device;
extracting paper fingerprint data from the image data;
converting the paper fingerprint data into code data;
printing the code data and document data on the output paper sheet, the printing being executed by a printing device;
determining whether the converting has been completed; and
transporting the output paper sheet housed in the housing device to the printing device after the converting has been completed.

11. A computer-readable medium having computer-executable instructions which when executed perform steps, comprising:
scanning image data on an output paper sheet;
extracting paper fingerprint data from the image data;
converting the paper fingerprint data into code data;
printing the code data and document data on the output paper sheet, the printing being executed by a printing device;
determining whether the converting has been completed; and
transporting the output paper sheet to the printing device after the converting has been completed.

12. A computer-readable medium having computer-executable instructions which when executed perform steps, comprising:
scanning image data on an output paper sheet;
housing the output paper sheet in a housing device;
extracting paper fingerprint data from the image data;
converting the paper fingerprint data into code data;
printing the code data and document data on the output paper sheet, the printing being executed by a printing device;
determining whether the converting has been completed; and
transporting the output paper sheet housed in the housing device to the printing device after the converting has been completed.

* * * * *